United States Patent [19]
Ahn

[11] Patent Number: 6,000,910
[45] Date of Patent: Dec. 14, 1999

[54] ELECTRIC FAN

[75] Inventor: Soon Suk Ahn, Ahnyang, Rep. of Korea

[73] Assignee: Young Jun Ahn, Rep. of Korea

[21] Appl. No.: 08/656,328

[22] PCT Filed: Dec. 13, 1994

[86] PCT No.: PCT/KR94/00176

§ 371 Date: Aug. 7, 1996

§ 102(e) Date: Aug. 7, 1996

[87] PCT Pub. No.: WO95/16861

PCT Pub. Date: Jun. 22, 1995

[30] Foreign Application Priority Data

Dec. 13, 1993 [KR] Rep. of Korea ............... 93-27516

[51] Int. Cl.[6] ............................................. F04D 29/36
[52] U.S. Cl. ........................................ 416/98; 416/100
[58] Field of Search ..................................... 416/98, 100

[56] References Cited

U.S. PATENT DOCUMENTS 1,094,540 4/1914 Dilg .
4,922,766 5/1990 Ahn .

FOREIGN PATENT DOCUMENTS 1018186 10/1957 Germany .
2136877 9/1984 United Kingdom .

*Primary Examiner*—John Kwon
*Attorney, Agent, or Firm*—Banner & Witcoff, ltd.

[57] ABSTRACT

The present invention relates to an electric fan employing three impellers which are so implemented as to receive the driving force of the motor and, more particularly, to an electric fan equipped with the second crank device and the convex surfaced driving bevel friction wheel and driven bevel friction wheel to swing the fan impeller shaft up-down repeatedly and right or left simultaneously, and to an electric fan that has the carrying handle or the carrying handle with the wheels for the convenience of moving, and also to an electric fan that can separate the upper body from the lower body to establish itself as a short up-right standing type, an attache-to-ceiling type, or an attach-to-wall type, and to an electric fan that can get rid of blowing reaction by a stabilizer and, thus, stabilize the swing movement of the fan impeller.

32 Claims, 20 Drawing Sheets

ELECTRIC FAN

TECHNICAL FIELD OF THE INVENTION

The present invention relates to an electric fan, and more, particularly, to an improved electric fan from the one presented in the Korean Utility Model Publication No. 89-1902 (U.S. Pat. No. 4,922,766), invented by the same inventor of the present invention, that employs a plurality of fan impellers, e.g. three impellers, thus sending the wind generated by the fan impellers to 360 degrees in all directions and manipulating each impeller independently as well.

BACKGROUND OF THE INVENTION

Conventional electric fans were either of the structure of using a wind direction shifting plate without moving the fan head itself to change the direction of the wind generated by the fan impellers, or of the structure of mounting a fan impeller coaxially to the motor and swinging the fan head from left to right and vice-versa by a certain fixed crank device.

Accordingly, these conventional electric fans displayed the problem of not sending wind to all directions, thus leaving the other side with no wind in a hot state.

To overcome this problem, the inventor of the present invention proposed an electric fan in the Korean Utility Model Publication No. 89-1902 (U.S. Pat. No. 4,922,766) employing a plurality of fan impellers, e.g. three impellers that are detatchably connected to the driving motor, each of said fan impellers being arranged with 120 degrees in radial direction and driven individually or simultaneously by using the fan clutch device, thus sending the wind to 360 degrees in all directions.

However, said previously invented electric fan not only had an inefficiency of driving force transmission due to the flat surface of the friction face of both the driven bevel friction wheel which is located at one end of the fan impeller shaft and the driving bevel friction wheel which is located at one end of the driving motor shaft, but did not have any means for controlling or adjusting the slanted angle of the fan impeller in vertical movement and, thus, sent no wind to the up-and-down direction.

Another problem raised in the previously invented electric fan is a blowing reaction which makes the fan head be biased to right or left. That is, since an electric fan which is in general formed by a plurality of helical fan blades, is a device which sends the wind to the front of the fan impeller by turning the fan impeller rapidly, the fan impeller receives some blowing reaction during operation due to the direction of the helical fan blades. The previously invented fan was so implemented as to have three fan impellers and, therefore, if all the fan impellers were blowing the wind and turning simultaneously in one direction, the blowing amount of wind will increase and so will the blowing reaction as much. That is, when the fan impellers were turning in one direction, e. g. to the left by the operation of a crank device while still blowing, the blowing reaction will be added to its turning force to the left, thus, the turning speed will increase. On the other hand, when the fan impellers were turning to the right, the blowing reaction will work against the turning force, and this resulted in some vibration to the fan impeller itself and an excess load on the driving motor.

Further, since the fan clutch device of the previously invented electric fan is of a screw type, some inconvenience in manipulating the shaft clutch device due to incurrence of some extra time, resulted.

And also, since the previously proposed electric fan has three fan impellers, the total weight thereof becomes too heavy to move around and also since the control switch was provided on the lower body, which works as a support for the upper body, the upper body could not be separated from the lower body and, thus, it could not be constructed as a short up-right standing type and/or an attach-to-ceiling type and/or an attach-to-wall type.

SUMMARY OF THE INVENTION

Therefore, the present invention has objectives to overcome the problems stated above from the invention in the Korean Utility Model Publication No. 89-1902 (U.S. Pat. No. 4,922,766).

One objective of the present invention is to provide an electric fan that has an outstanding friction efficiency between the friction faces of the driven bevel friction wheel which is located at one end of the fan impeller shaft and the driving bevel friction wheel which is located at one end of the driving motor shaft.

Another objective is to provide an electric fan that has a crank device to adjust the slanted angle of the fan impeller shaft for swinging the fan impeller up and down.

Further, another objective is to provide an electric fan that has a stabilized swinging movement of the fan impellers when the latter is turning to left or right simultaneously.

Yet another objective is to provide an electric fan that is so constructed that the lower body, which works as a support for the upper body, and the upper body, which has substantially important parts such as fan impellers, a clutch device and a crank device, can be separated from each other and, thus, to establish itself as a short up-right standing type and/or an attach-to-ceiling type and/or an attach-to-wall type.

Another objective is to provide an electric fan with an easy mobility.

Still another objective of the present invention is to provide an electric fan that has a plurality of fan impellers turning to left and right and up and down simultaneously or independently so as to provide wind to all directions.

To meet theses objectives, one embodiment of the electric fan would have an upper body which comprises a driving motor and a plurality of fan impellers and a lower body which is removably attached to said upper body as a support.

The upper body of the electric fan according to the present invention comprises:

a cylindric housing which has an upper plate, a middle supporting plate, and a lower plate, these plates being horizontally arranged With some distance from each other with an axis, and a wall plate which circumscribes the outer circumferences of said upper, middle and lower plates;

a driving motor that is coaxially mounted to the axis of said housing and secured between said upper plate and said middle supporting plate, wherein the free end of the upper driving shaft of the motor extends to the outside of the housing bar passing through said upper plate and the lower driving shaft of the motor extends downward by passing through said middle supporting plate;

a rotary disk that has a trident flange and a cylindric part turnably mounted around said upper driving shaft;

base brackets that are pivotably secured to the flanges of said rotary disk and serve to be the mounting bases for fan impeller shafts;

a plurality of fan impeller shafts that are arranged substantially horizontally around the upper driving shaft of the motor, and receive the driving force of the upper driving shaft perpendicularly or in random degrees simultaneously or independently;

fan clutch devices that are so arranged at said base brackets that each of the fan impeller shafts can receive the driving force of said upper driving shaft of the motor independently;

a motor clutch device that is located between said middle supporting plate and lower plate of the housing so as to transmit the driving force of said lower driving shaft to a first crank device optionally;

a first crank device that makes said rotary disk swing in horizontal direction centering around said upper driving shaft of the motor;

a stabilizer so as to get rid of blowing reaction of the fan impellers and, thus, to make the swing movement of the fan impellers stabilized; and a control switch equipped with an interrupting electric connector mounted at one side of said housing, and, said lower body comprises:

a substantially flat base plate that supports the weight of said upper body; and a supporting rod which comprises a lower hollow cylindric member fixedly secured to the center of said base plate, an extendible upper cylindric member inserted into said lower cylindric member and a compression spring which is arranged beneath said upper cylindric member, the upper end of said upper cylindric member being removably secured to the center of the lower plate of the housing.

Further, according to one of the characteristic aspects of the present invention said upper body of the electric fan may further comprise carrying handles that are radially and pivotably attached at the bottom of the lower plate of the housing.

According to another aspect of the present invention, said upper body additionally further comprise a second crank device so as to make the fan impeller shafts swing up and down repeatedly.

Additional objects and other advantageous aspects of the present invention will become apparent upon considering the following detailed description and accompanying drawings.

BRIEF DESCRIPTION OF THE INVENTION

BEST EMBODIMENTS FOR CARRYING OUT THE INVENTION

Figure 1:
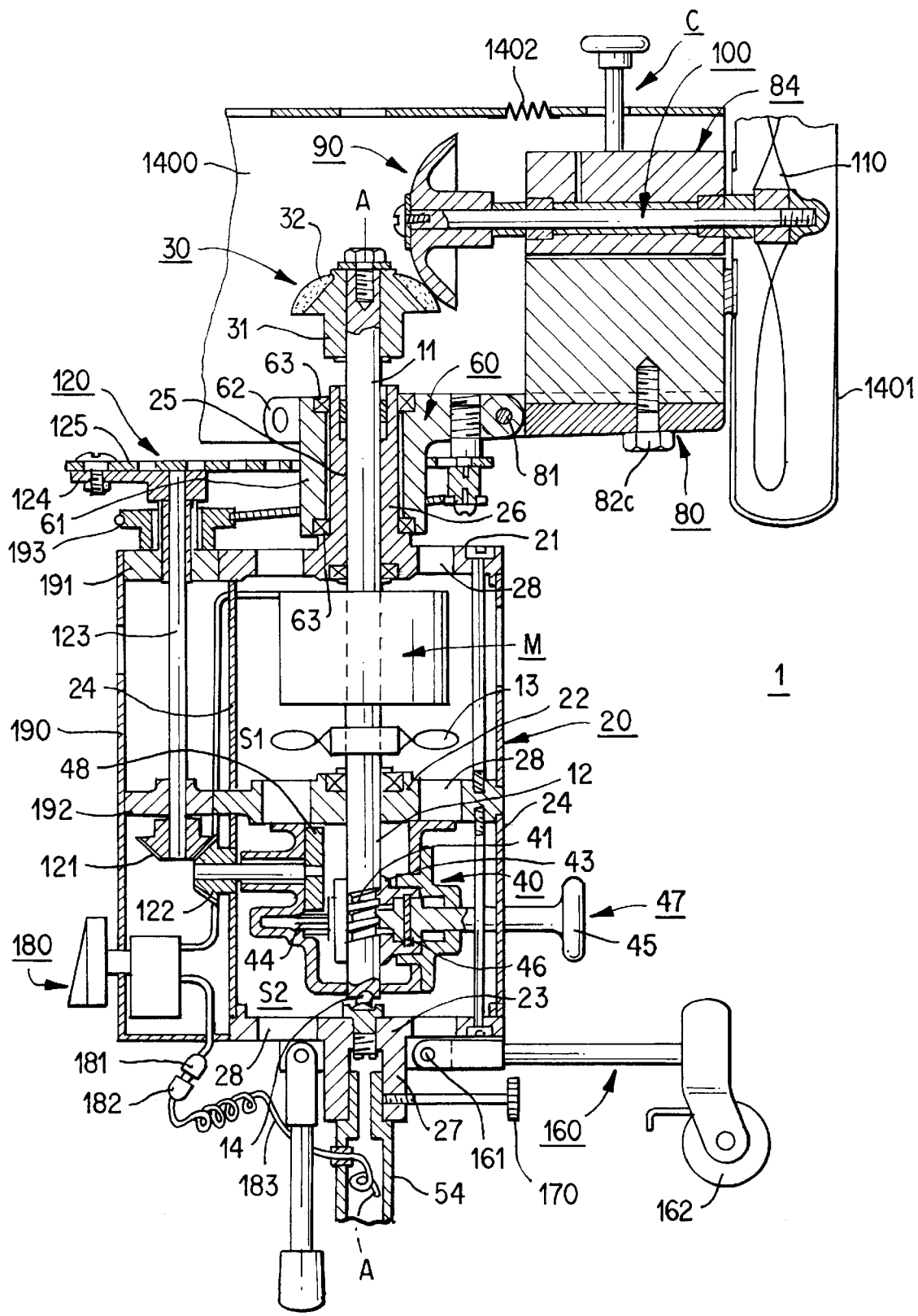
FIG. 1 shows a sectional view of the upper body of the electric fan designed according to the present invention.
Figure 2:
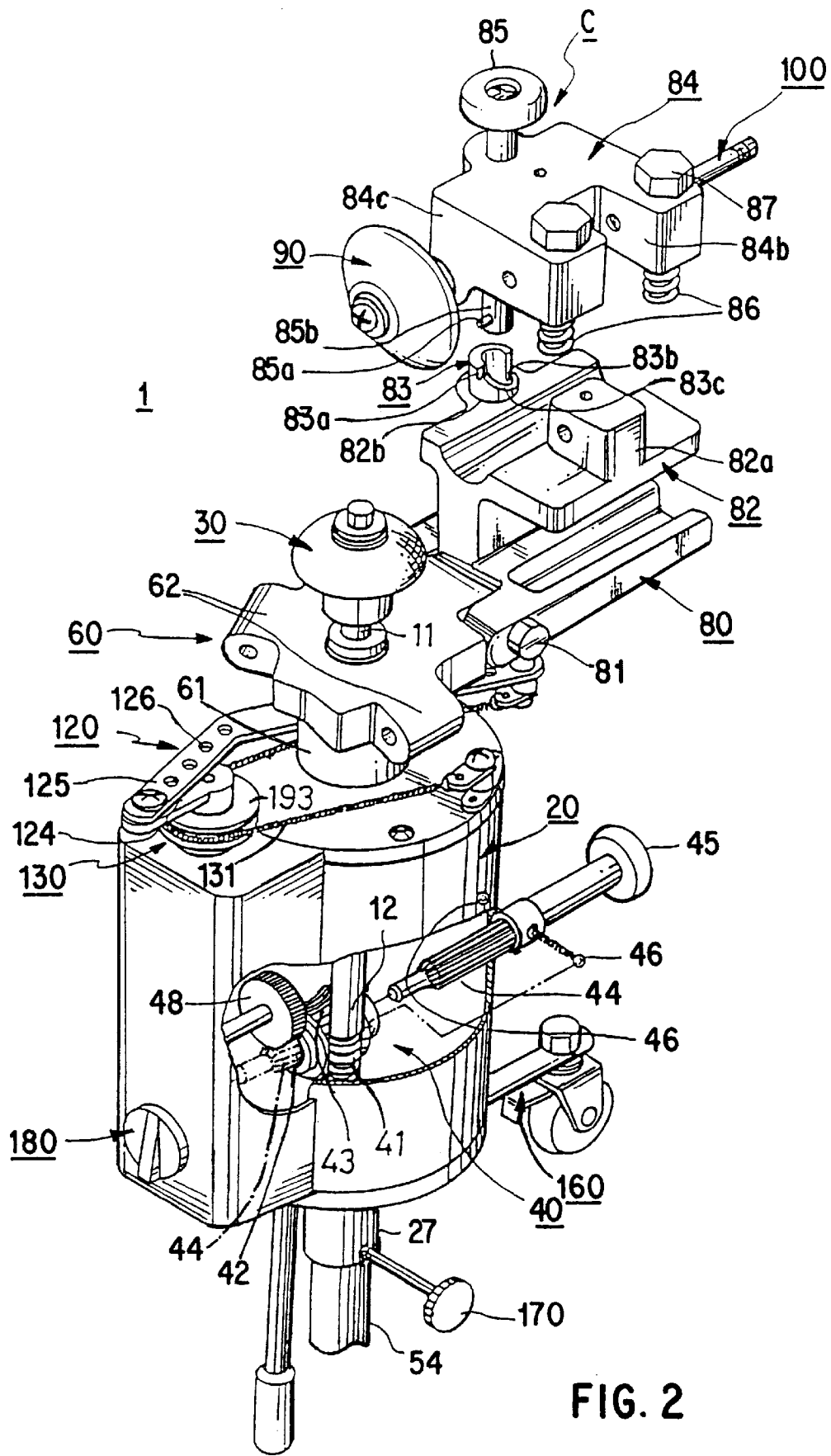
FIG. 2 shows a partially broken explosive view of the upper body of the electric fan designed according to the present invention.
Figure 3:
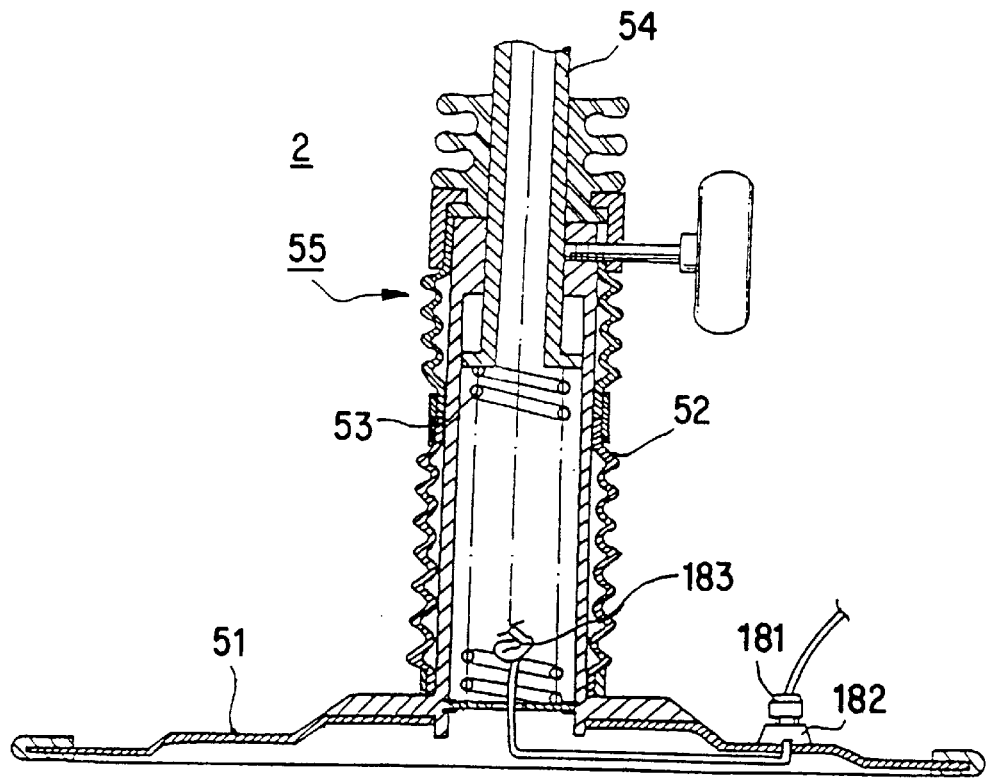
FIG. 3 shows a sectional view of the lower body of the electric fan designed according to the present invention.

FIG. 1 depicts a sectional view of the upper body of the electric fan according to the present invention and FIG. 2 shows a partially broken explosive view of the same upper body.

The upper body 1, as shown in FIG. 1 and FIG. 2, comprises a housing 20, a driving motor M, a clutch device 40, a rotary disk 60, base brackets 80 for mounting the fan impellers, three fan impeller shafts 100 (only one shown in the drawing), a crank device 120 for making the rotary disk swing in horizontal direction, a fan clutch device C, carrying handles 160 and a control switch 180.

The housing 20 comprises an upper plate 21, a middle supporting plate 22 and a lower plate 23 being arranged with some distance from each other with an axis A and a wall plate which circumscribes the outer circumferences of said upper, middle, and lower plates. The inside of the housing is divided into an upper space S1 and a lower space S2 by said middle supporting plate 22.

The driving motor M is located in the upper space S1 coaxially to the housing axis A and has an upper driving shaft 11 and a lower driving shaft 12. Said upper driving shaft 11 and lower driving shaft 12 is a single body and driven simultaneously by the driving motor M, however, to be specific, the upper driving shaft 11 serves to drive each fan impeller shaft by means of a couple of bevel friction wheels which will be described in detail hereinafter and the lower driving shaft 12 makes the rotary disk 60 turn to left or right by means of a clutch device 40.

A hub 26 is formed on the center of the upper plate 21 of the housing coaxially and vertically. The hub 26 has a hole 25 which communicates with the upper space Si of the housing at the center of the upper plate 21, through which said upper driving motor shaft 11 extends to the outside of the housing.

The supporting plate 22 mounted at the middle position of the housing not only turnably supports the lower driving shaft 12 of said motor M but also plays a role as a bracket to mount the clutch device 40 that is secured inside of the lower space S2 of the housing.

The lower driving shaft 12 of said driving motor M extends downward to the lower space S2 of the housing and a motor cooling fan 13 is fixed at the outer circumference of the lower driving shaft 12 inside the upper space S1 to prevent the overheating of the motor M. Concerning this, it is desirable to form several ventilating holes 28 on the upper plate 21, on the middle supporting plate 22 and on the lower plate 23.

A rotating bearing ball 14 which serves as a coaxial support for the free-end of the lower driving shaft 12 of the driving motor M is secured at the center of the top surface of said lower plate 23 and at the bottom of the lower plate 23 is formed a connection neck 27 to removably connect the upper body with the lower body.

The upper driving shaft 11 of the motor M extends to the outside through the hole 25 of said hub and, thus, the free end thereof exposes to the outside and a driving bevel friction wheel 30 is fixed at the same free end.

Around the hub 26, a turnable rotary disk 60 equipped with a hollow cylindric part 61 and a trident flange 62 protruded horizontally with arrangement of 120 degrees in radial direction around the circumference of said cylindric part 61 is mounted with the bearings 63. Said rotary disk rotates to left or right repeatedly with the aid of the first crank device 120 mentioned later.

At the front-ends of each flange of said rotary disk 60, base brackets 80 for mounting the fan impeller shafts are pivottably secured through slope adjusting bolts 81, and the fan impeller shafts 100 are so substantially horizontally arranged on said base brackets 80 respectively that the driven bevel friction wheels 90 mounted at one end thereof can receive the driving force of the driving bevel friction wheel 30 mounted on the upper free end of the driving shaft 11. The fan impellers 110 are attached at the other end of said fan impeller shafts 100 respectively.

It should be noted that one of the most important features in the present invention is that at least one of the slanted surfaces of said driving bevel friction wheel 30 and the driven bevel friction wheel 90 which are fixed at the one end of the driving shaft 11 and of the fan impeller shaft 100 respectively is smoothly convex and, thus, the electric fan designed according to the present invention, when said friction bevel wheels 30 & 90 are contacting each other, has better driving force transmission efficiency than one presented in the Korean Utility Model Publication No. 89-1902 (U.S. Pat. No. 4,929,2,766).

To be specific, for reference, the driving bevel friction wheel and the driven bevel friction wheel disclosed in the Korean Utility Model Publication No. 89-1902 (U.S. Pat. No. 4,922,766) have a flat and relatively large contacting area; thus, the contacting pressure of the unit area between the contacting surfaces of the two wheels is very low and if the mounting angle of the base bracket 80 for mounting the fan impeller shaft is tilted from the rotary disk flange 62 due to long-term driving or outer sudden shock or other reasons, then, the driving force transmission would fail because of the unstable contact between both wheels.

However, the driving bevel friction wheel 30 and the driven bevel friction wheel 90 according to the present invention will maintain very high contacting pressure even when the contacting angle therebetween is changed due to the convex surface of the driving bevel friction wheel 30 and/or the driven bevel friction wheel 90.

By making the surfaces of both or one of the slanted surfaces of the driving bevel friction wheel 30 and the driven bevel friction wheel 90 convex not only the driving force transmission efficiency can be increased but the direction of the wind can be varied by setting the contacting angle of the driving bevel friction wheel 30 and the driven bevel friction wheel 90, for example, to a right angle, an acute angle, or an obtuse angle by controlling the slope adjusting bolt 81.

Furthermore, as will be explained in details later, if a second crank device 1200 which serves to swing the fan impeller shaft 100 consecutively up and down is added, the fan impeller shaft 100 can be swung up or down while the driven bevel friction wheel 90 mounted at one end of the fan impeller shaft keeps on contacting the driving bevel friction wheel 30 and, thus, can be swung around horizontally and vertically. Therefore, the electric fan designed according to the present invention can achieve the efficiency to send the wind to all directions simultaneously.

To achieve such an efficiency, the slanted outer surface of the cone-structured boss member of the driving bevel friction wheel and/or the driven bevel friction wheel is to be preferably covered or formed with convex shaped elastic rubber plate or elastic synthetic plastic plate 32 which has enough solidity, elasticity and anti-abrasion characteristic. Said covering material may be selected among the known various kinds of engineering plastics.

The shape of the elastic rubber plate or the elastic synthetic plastic plate 32 that is firmly secured on the slanted surface of the conestructured boss member 31 can be one of the following types as long as the above efficiency is achieved, that is, a plane type, a convex type, a cylinder type, a curve type, and a hollow cylinder type, etc. Said convex type can be preferably of a semi-sphere.

Figure 8:
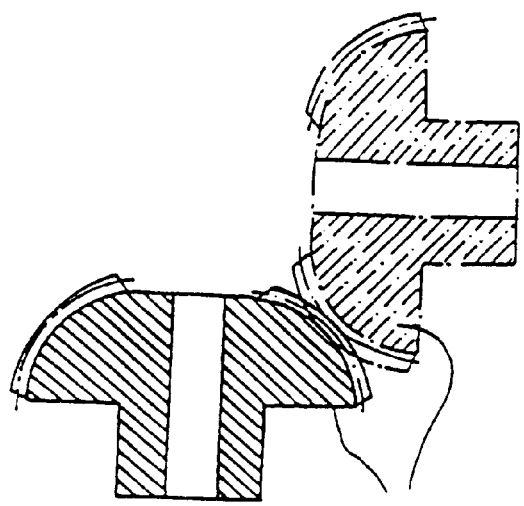
FIG. 8 shows a sectional view of a pair of convex surfaced bevel gears.

Furthermore, instead of using the convex elastic bevel friction wheel mentioned above, a couple of convex bevel gears 35 shown in FIG. 8 may be used with the same effect as when said elastic convex bevel friction wheel is used that transmits the driving force regardless of the change in the contacting angle.

Figure 9:
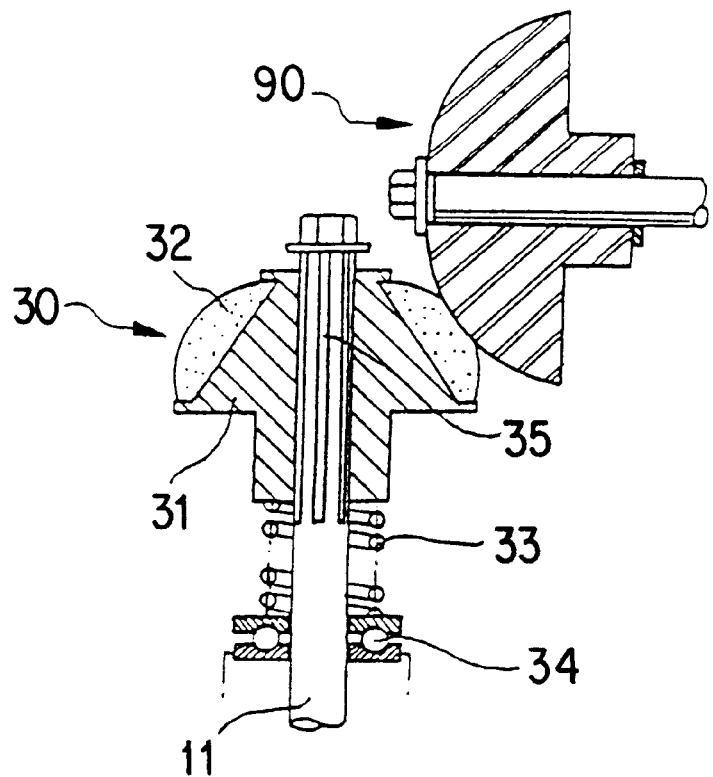
FIG. 9 shows a sectional view of the compression spring elastically setted to the bottom of the driving bevel friction wheel.
Figure 10:
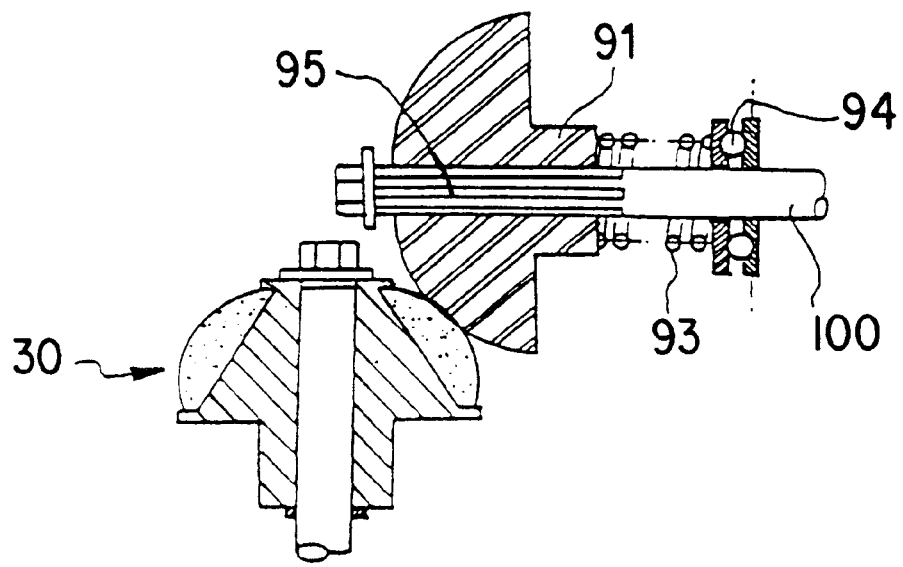
FIG. 10 shows a sectional view of the compression spring elastically setted to the bottom of the driven bevel friction wheel.

Also, as can be understood from the above, by contacting the driving bevel friction wheel 30 with the driven bevel friction wheel 90 with elasticity, the friction efficiency can be increased due to spot contacting. This is more feasible by elastically mounting a compression spring 33 with interposition of a bearing 34 at the bottom surface of said boss member 31 and with slidable coupling the driving wheel 30 with the shaft 11 by means of a spline connection 35 as shown in FIG. 9, or by elastically mounting the compression spring 93 with interposition of a bearing 94 at the bottom surface of said boss member 91 and with slidable coupling the driven wheel 90 with the fan impeller shaft 100 by means of as a spline connection 95 shown in FIG. 10, or by making both of said bevel friction wheels 30 & 90 apply the compressing force to each other through combining both structures shown in FIG. 9 and FIG. 10.

Following are detailed descriptions of several embodiments of the fan clutch device C which is mounted on the base bracket 80 so that each of the fan impeller shaft 100 can receive the driving force of the upper driving shaft 11 optionally, referencing the FIGS. 1, 2, 3, 5, 6 and 11 to 20C.

As shown in the FIGS. 1, 2, 5, and 6, the fan clutch device C comprises a lower bracket 82 which is fixed at the base bracket 80 by means of a bolt 82c and includes a connecting protrusion 82a and a hollow cylindric column having a ramp 83c and grooves 83a & 83b formed on the upper end and the lower end of said ramp, an upper bracket 84 which is pivotably coupled with said lower bracket 82 by mating said connecting protrusion 82a with a recess 84b formed on one side thereof with pivot pin 84a and includes a cylindric rod turnably inserted into said hollow column 82b and the pin 85a of which is guided along the slope of said ramp 83c and, thus, to serve as a cam and a body part 84c which is turnably supporting the fan impeller shaft 100.

Figures 5, 6:
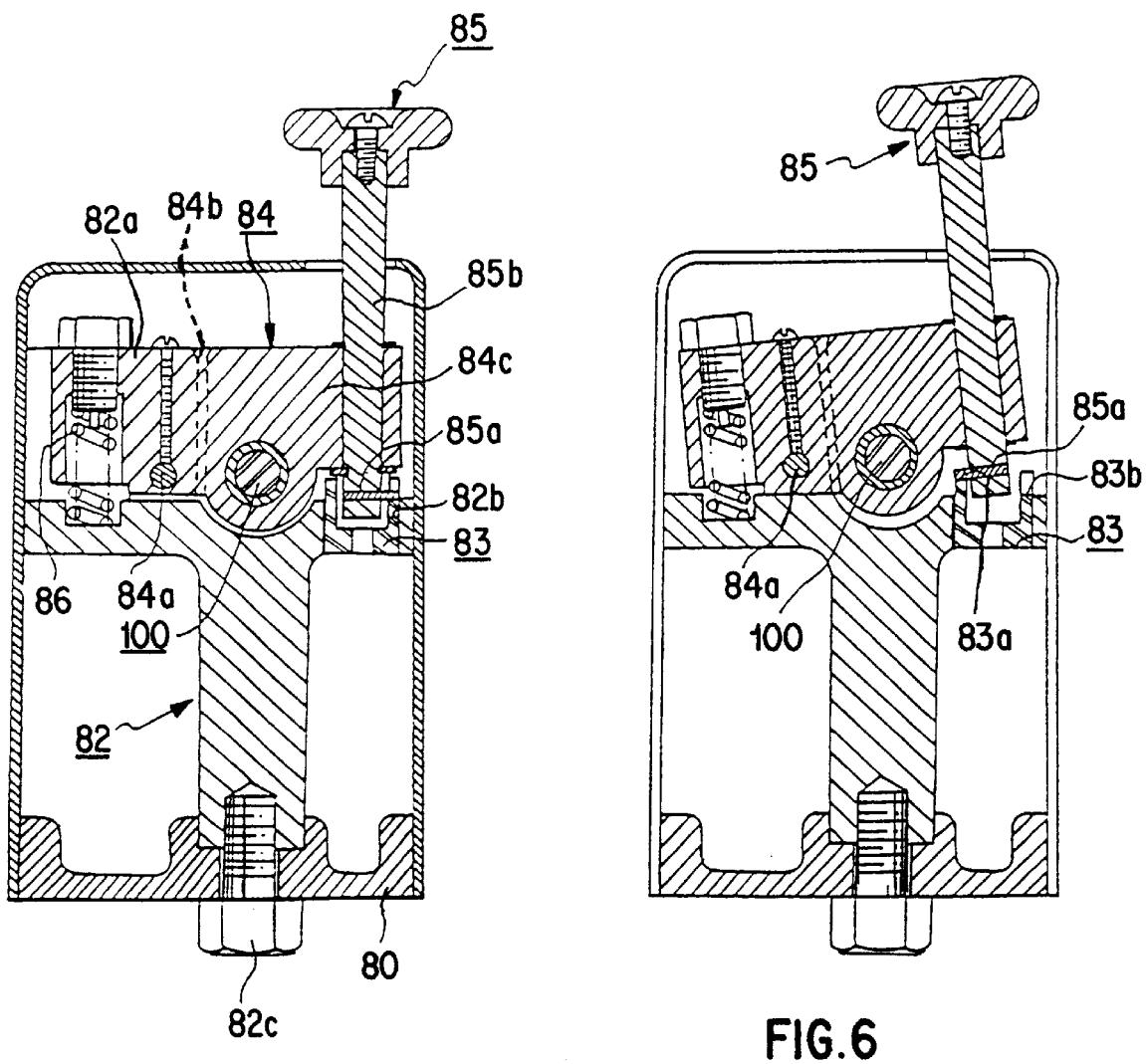
FIG. 5 shows a sectional view of the first embodiment of the fan clutch device.
FIG. 6 shows a sectional view of the fan clutch device depicted in FIG. 5 which shows the operation thereof.
Figure 7A:
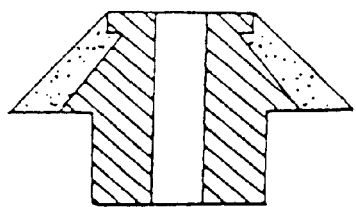
FIGS. 7A to 7E show several sectional views of the driving bevel friction wheel.
Figure 7B:
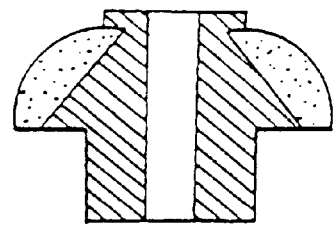
Figure 7C:
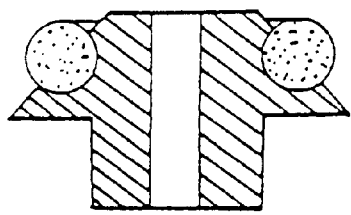
Figure 7D:
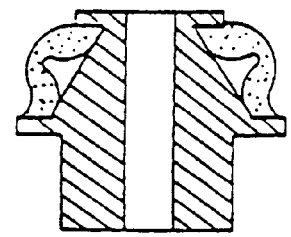
Figure 7E:
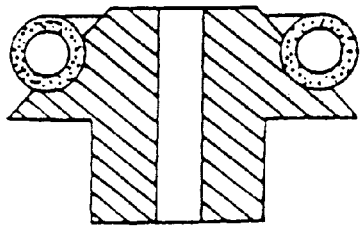

Therefore, as shown in FIG. 5, if the cam pin 85a is slid along the slanted surface 83C of the cam 83 and inserted to the lower pin groove 83b by turning the said interrupting knob 85, then the upper bracket 84 lowers down along with the fan impeller shaft 100 centering around the pivot pin 84a and, thus, the driven bevel friction wheel 90 will contact with the driving bevel friction wheel 30 and this will remain by the elasticity of the compression spring 86. And, as shown in FIG. 6, if the manipulating knob 85 is turned to the opposite direction, the cam pin 85a will slide up and fit to the upper pin groove 83a and, therefore, the upper bracket 84 will turn upward along with the fan impeller shaft 100, and, thus, the driven bevel friction wheel 90 become detached from the driving bevel friction wheel 30.

The following are descriptions of the embodiments of the fan clutch device C being different from that of said first embodiment which are shown in FIG. 11 to FIG. 20C. Regarding the figures and descriptions, the explanation on the corresponding elements to those of the first embodiment are omitted even if the shapes are quite different from each other, but the same identifying numbers or symbols are assigned.

Figure 11A:
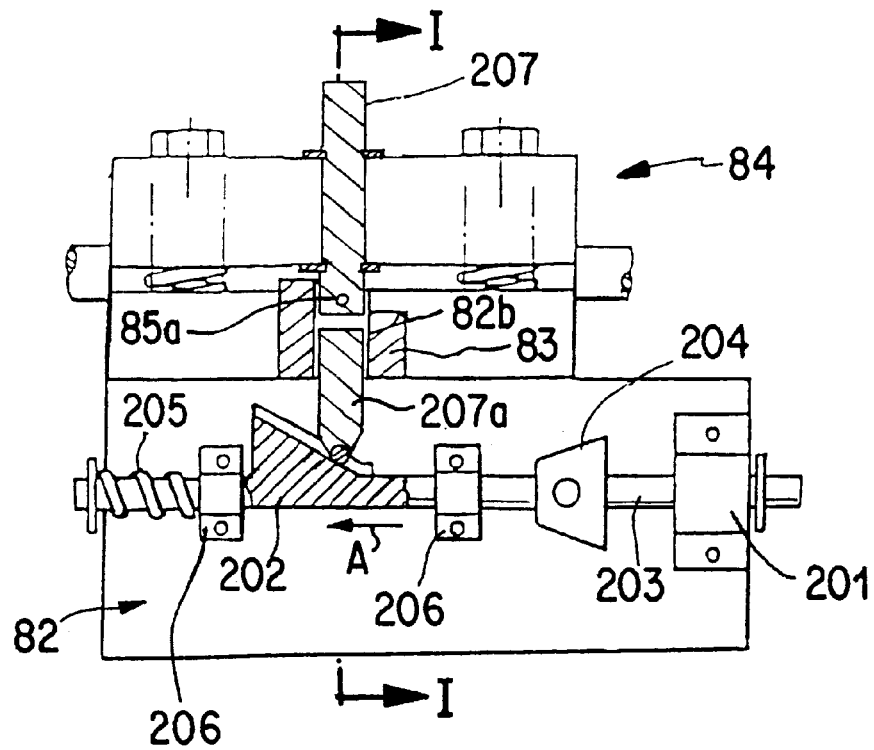
FIG. 11A shows a sectional view of the second embodiment of the fan clutch device.
Figure 11B:
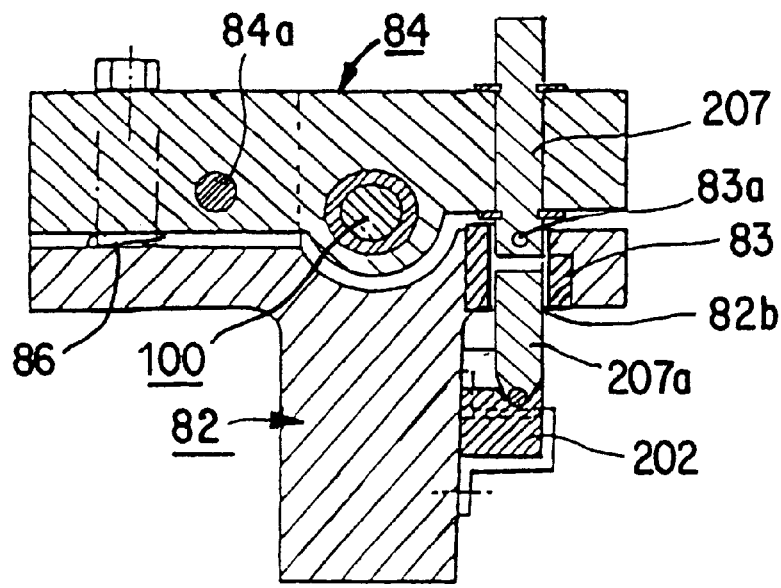
FIG. 11B shows a sectional view of the line I—I of FIG. 11A.

FIGS. 11A and 11B show the second embodiment of the fan clutch device C.

This fan clutch device C comprises the upper and lower brackets 84 & 82 which are the same with those of the fan clutch device of the first embodiment, a solenoid 201 secured to said lower bracket 82, an operating rod 203 having a interrupting part 202 at one end thereof and being slidable by said solenoid, a coupling plate 204 of said solenoid fixed around the middle of said operating rod, a returning spring 205 mounted around the outer circumference of said operating rod, a supporting bracket 206 mounted at the lower bracket 82 to compress said returning spring 205 and serve as a sliding guide for said operating rod 203, an interrupting rod 207 that has an upper member fixed at the upper bracket 84 and a lower member 207a contacting the slanted surface of said tapered interrupting part 202 and is slidable up and down through the hole 82b and compression springs 86.

Therefore, if the control switch 180 is manipulated to move said operating rod 203 to the right of the drawing by magnetizing the solenoid 201, the fan impeller shaft 100 turns upward centering around the pivot pin 84a because the bottom part of said interrupting rod 207 goes up and is located at top of the slanted surface of said tapered interrupting part 202, thus, detaching the driven bevel friction wheel 90 from the driving bevel friction wheel 30. On the contrary, if the solenoid is de-magnetized, the operating rod 203 will return to the left (A direction in FIG. 11A) by the elasticity of the returning spring 205 which is compressed at the supporting bracket 206 and, thus, the bottom tip of the interrupting rod becomes so positioned at the lower part of the slanted surface of said interrupting part 202 that the fan impeller shaft 100 can turn downward and the driven bevel friction wheel 90 will contact with the driving bevel friction wheel 30.

Figure 12:
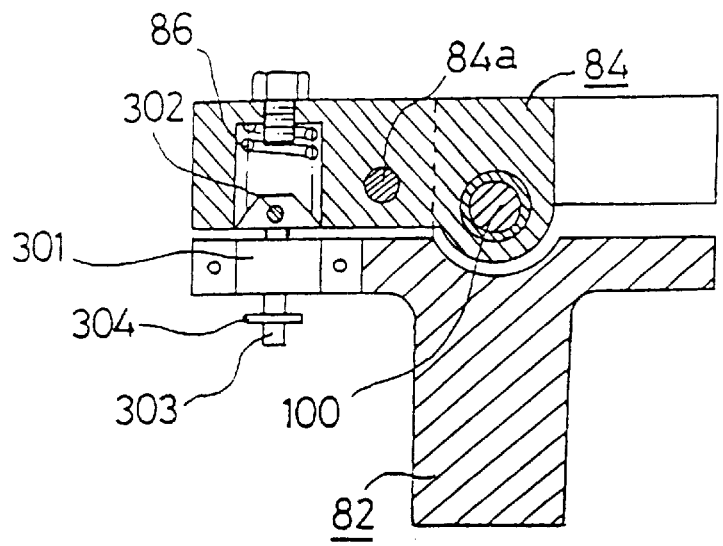
FIG. 12 shows a sectional view of the third embodiment of the fan clutch device.

FIG. 12 shows the third embodiment of the fan clutch device C.

This fan clutch device C comprises the upper and lower brackets 84 & 82 which are the same with those of the clutch device of the first embodiment, a solenoid 301 attached to the lower bracket 82, an operating rod 303 whose upper end is supported by a pin 302 at the upper bracket 84, a coupling plate 304 of said solenoid fixed around the middle of the said operating rod 303 and compression springs 86.

Therefore, if the control switch 180 is manipulated so as to move said operating rod 303 downward by magnetizing the solenoid 301, then the driven bevel friction wheel 90 will be detached from the driving bevel friction wheel 30. On the contrary, if the solenoid is demagnetized, the operating rod 303 will return upward because of the lowering movement of the fan impeller shaft 100, thus, the driven bevel friction wheel 30 will contact with the driving bevel friction wheel 90.

Figure 13:
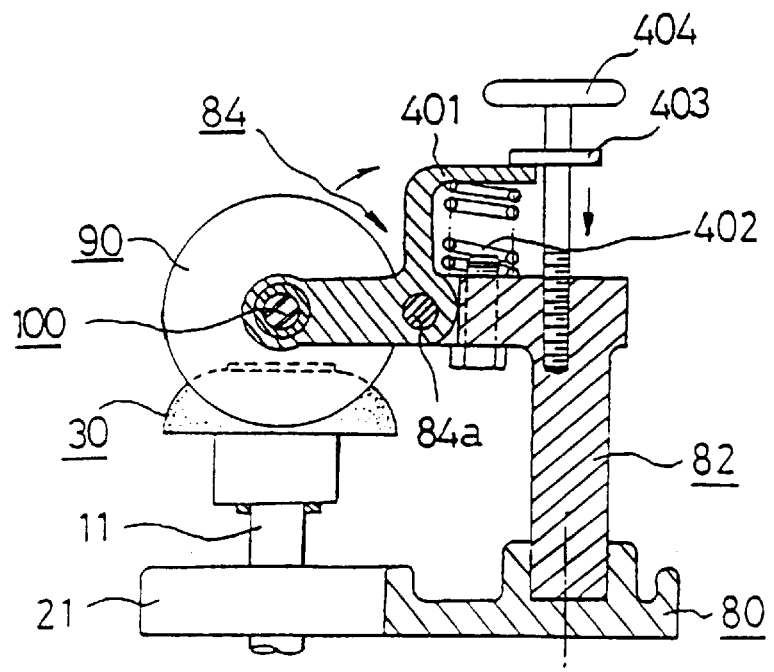
FIG. 13 shows a sectional view of the fourth embodiment of the fan clutch device.

The fourth embodiment of the fan clutch device C is shown in FIG. 13. This fan clutch device comprises a lower bracket 82 integrated vertically to the base bracket 80, an upper bracket 84 whose one end is pivotably secured at the upper part of said lower bracket 82 and other end turnably supports the fan impeller shaft 100 and has a lever 401, a compression spring 402 elastically arranged between said lever 401 and lower bracket 82 and an interrupting handle 404 that has a pressing member 403 which pivots said upper bracket 84 centering around the pivot pin 84a by pressing said lever 401.

Therefore, if the interrupting screw handle 404 is moved upward by screwing up, the driven bevel friction wheel 90 fixed at the one end of the fan impeller shaft 100 will contact with the driving bevel friction wheel 30 because the fan impeller shaft 100 secured at the upper bracket 84 goes down as the lever 401 pivots downward centering around the pivot pin 84a by said spring 402. Also, if the interrupting handle 404 is moved downward, the driven bevel friction wheel 90 will detach from the driving bevel friction wheel 30 since the upper bracket 84 pivots upward as the lever 401 which is suppressed by the pressing member 403 turns downward.

Figure 14A:
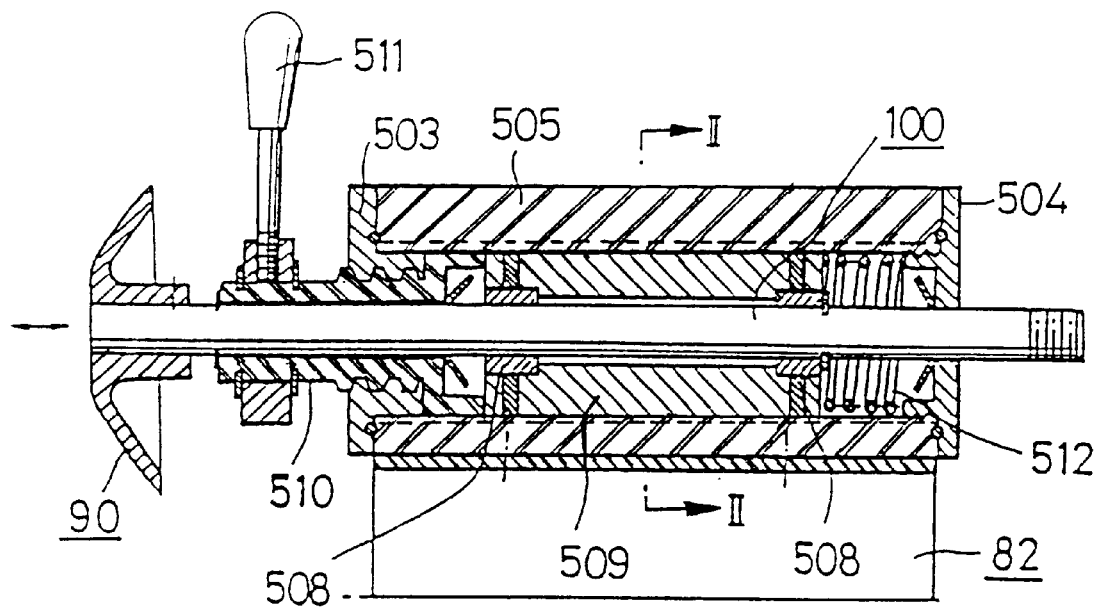
FIG. 14A shows a sectional view of the fifth embodiment of the fan clutch device.
Figure 14B:
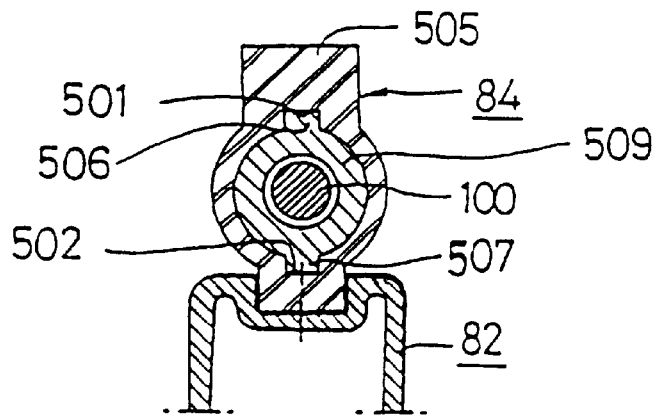
FIG. 14B shows a sectional view of the line II—II of FIG. 14A.

The fifth embodiment of the fan clutch device C is shown in FIG. 14. This fan clutch device comprises a lower bracket 82 arranged on the base bracket 80, a cylinder 505 that is mounted on the upper surface of said lower bracket and has end plates 503, 504 at both ends and key grooves 501 & 502 at both the top and the bottom of the inner circumference thereof, a slider 509 which turnably supports the fan impeller shaft 100 with oilless bushes 508 at the middle portion thereof and, has keys 506 & 507 at both the top and the bottom of the outer circumference thereof that are inserted into said key grooves 501, 502, respectively, an operating member 510 screwed to said end plate 503 with a big pitch, an interrupting handle 511 which is fixed at one side of the outer circumference of said operating member, and a compression spring 512 elastically inserted between said end plate 504 and the slider 509.

Therefore, if said interrupting handle 511 is turned to one side perpendicular to the fan impeller shaft 100, the driven bevel friction wheel 90 will contact the driving bevel friction wheel 30 because the fan impeller shaft 100, the slider 509 and the operating member 510 move to the left by the elasticity of the spring 512. On the contrary, if the interrupting handle is moved to the opposite direction, the driven bevel friction wheel 90 will be detached from the driving bevel friction wheel 30 because the fan impeller shaft 100 moves to the right according as the slider 509 moves to the right.

Figure 15A:
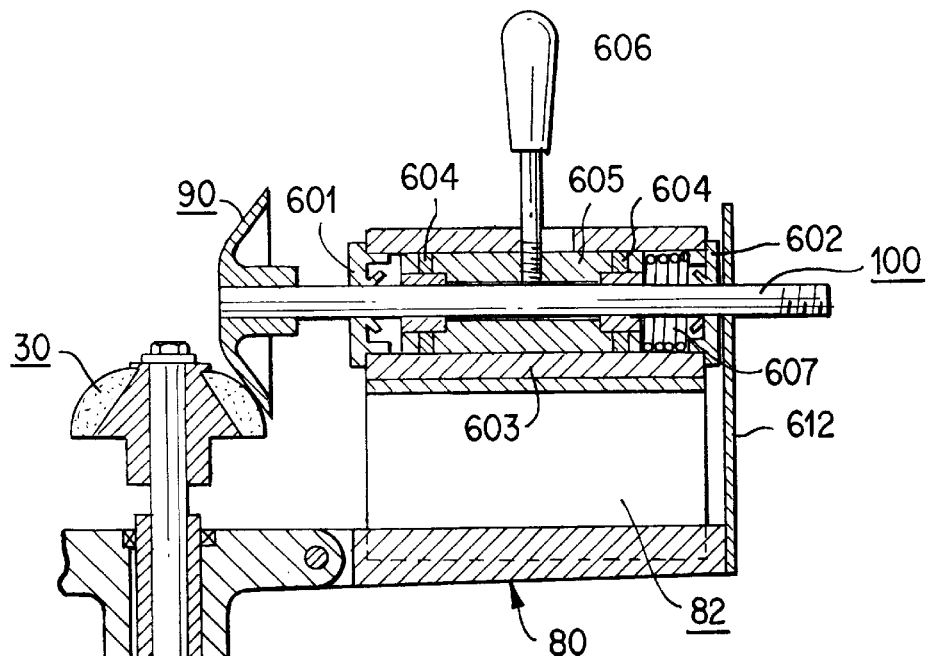
FIG. 15A shows a sectional view of the sixth embodiment of the fan clutch device.
Figure 15C:
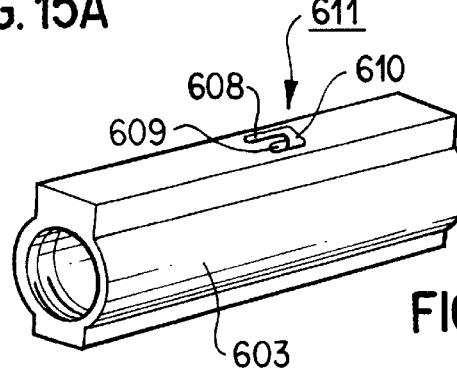
FIG. 15C shows a perspective view of the main body of the fan clutch device shown in FIG. 15A.
Figure 15B:
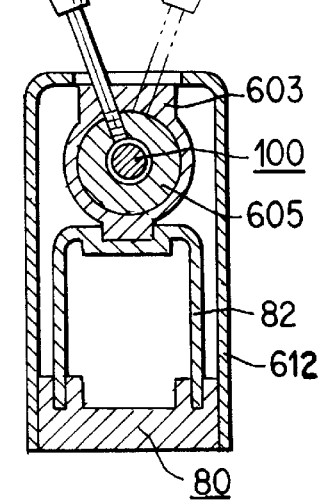
FIG. 15B shows a sectional view of the operational state of the fan clutch device shown in FIG. 15A.

FIGS. 15A, 15B, and 15C show the sixth embodiment of the fan clutch device. This fan clutch comprises a lower bracket 82 arranged on the base bracket 80, a cylinder 603 which has end plates 601, 602 at both ends thereof and is secured at the top surface of said lower bracket 82, a slider 605 which turnably supports the fan impeller shaft 100 with oilless bushes 604 at the middle portion thereof, an interrupting handle 606 whose bottom end is passing through the upper surface of the said cylinder 603 and is secured at the outer circumference of said slider 605, and a compression spring 607 elastically inserted between the end plate 602 and the slider 605. On the top surface of the cylinder 603 is formed a guiding hole 611 which is consisted of an oblong hole 608, a short hole 609 and a connecting hole 610 as shown in the FIG. 15C, thus, said interrupting handle 606 can be shifted through said guiding hole 611.

Therefore, if the interrupting handle 606 is moved to the left of the oblong hole 608 the driven bevel friction wheel 90 will contact with the driving bevel friction wheel 30 because the fan impeller shaft 100 is moved to the left along with the slider 605. This contacting state is maintained because of the elasticity of the spring 607. On the other hand, if said interrupting handle 606 is moved to the short hole 609, the driven bevel friction wheel 90 will be detached from the driving bevel friction wheel 30 because the fan impeller shaft 100 is moved to the right along with the slider 605.

Figure 15D:
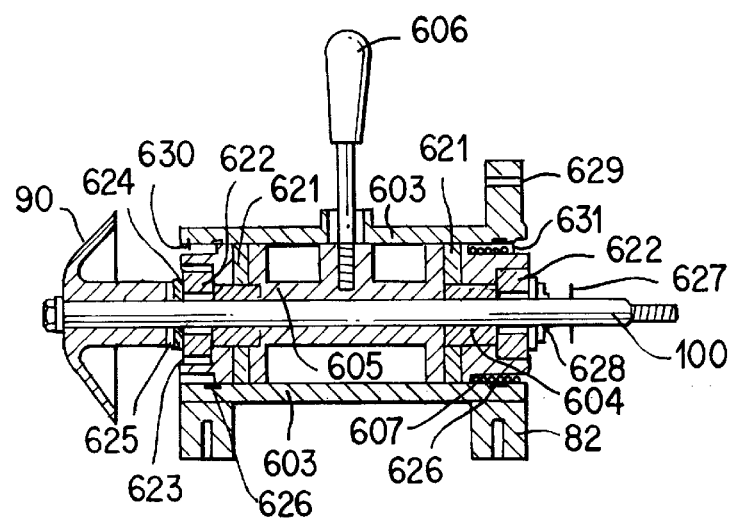
FIG. 15D shows a sectional view of the fan clutch device which has different and added elements from those of FIGS. 15A to 15C while maintaining same operation.

The fan clutch device depicted in FIG. 15D maintains the same operation of that as explained above with FIGS. 15A to 15C. However, some elements are replaced and added, that is, said end plates 601, 602 are replaced by a slider dislocation prevention snap ring 630 and a spring dislocation prevention snap ring 631 respectively, and an oil storing filler 621 is added around said oilless bushes 604, and an oil leakage absorbing filler 622, an oil leakage preventing cover 623, an oil leakage preventing rubber plate 624, and a steel washer 625 are additionally attached to the left and right side of the slider 605. The symbol 626 represents a slider oil leakage absorbing filler, the symbol 627 represents a fan impeller fixing pin and the symbol 629 represents the fan impeller protecting cover fixing bolt hole. The rest of the elements are the same as those of the sixth embodiment.

Figure 16A:
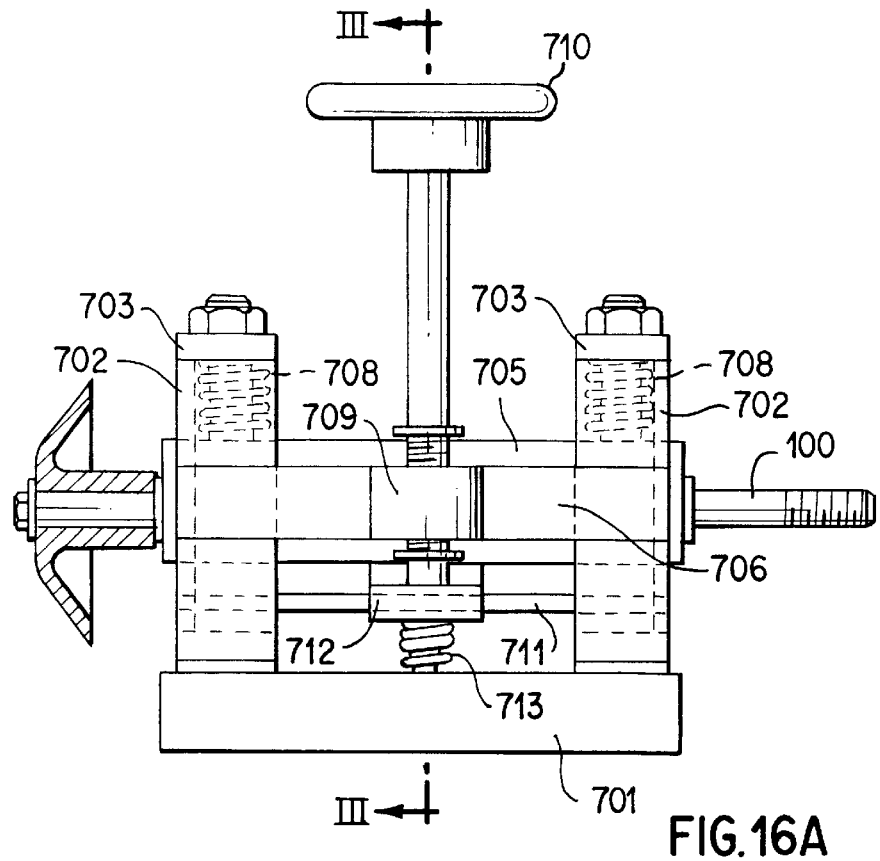
FIG. 16A shows a front view of the seventh embodiment of the fan clutch device.
Figure 16B:
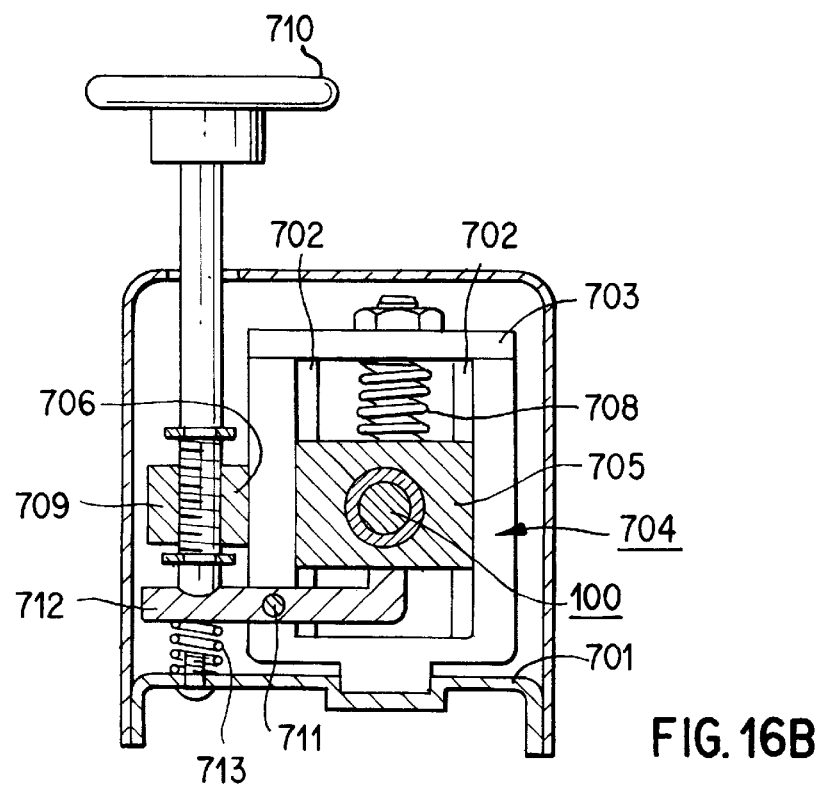
FIG. 16B shows a sectional view of the line III—III of FIG. 16A.

FIGS. 16A and 16B show the seventh embodiment of the fan clutch device. This fan clutch device comprises a lower bracket 701 arranged on the base bracket 80, an upper bracket 704 mounted on said lower bracket and formed by connecting the top part of the vertical guide rail or guide groove 702 with horizontal crossing members 703, a slider 705 supporting the fan impeller shaft 100 and arranged so as to be slid up and down along inside said guide rail of the upper bracket, a compression spring 708 that is elastically inserted between the crossing member 703 and the upper surface of said slider, a supporting member 709 fixed at the middle of the connecting plate 706 that connects both the side parts of said guide rail 702 horizontally, an interrupting handle whose lower part is screwed to said supporting member 709, a lever 712 that supports the lower part of the said slider and is so implemented as to work like a seesaw centering around the supporting shaft 711 which is secured horizontally between said left and right guide rails 702 and a compression spring 713 that is elastically inserted between the lower surface of said lever 712 and the upper surface of the lower bracket 701. It is preferable that said interrupt handle 710 is screwed to the supporting member 709 by forming a rectangular screw with a big pitch.

Therefore, if the interrupting handle 710 is turned the handle will move upward and the one-end of said lever 712, which is in contact with the handle, will move upward by the elasticity of the spring 713 as well, and, thus, the other end of the lever lowers down by the elasticity of the spring 708 centering around said supporting shaft 711 and, therefore, the driven bevel friction wheel 90 will contact with the driving bevel friction wheel 30 according as the fan impeller shaft 100 lowers down along with the slider 705. Also, if the interrupting handle is turned to the opposite direction, the same handle will move downward, and one end of the lever 712 which is in contact with said handle will move downward and the other end of the lever will move upward to push the slider 705 upward and, thus, the driven bevel friction wheel 90 is detached from the driving bevel friction wheel 30.

Figure 17A:
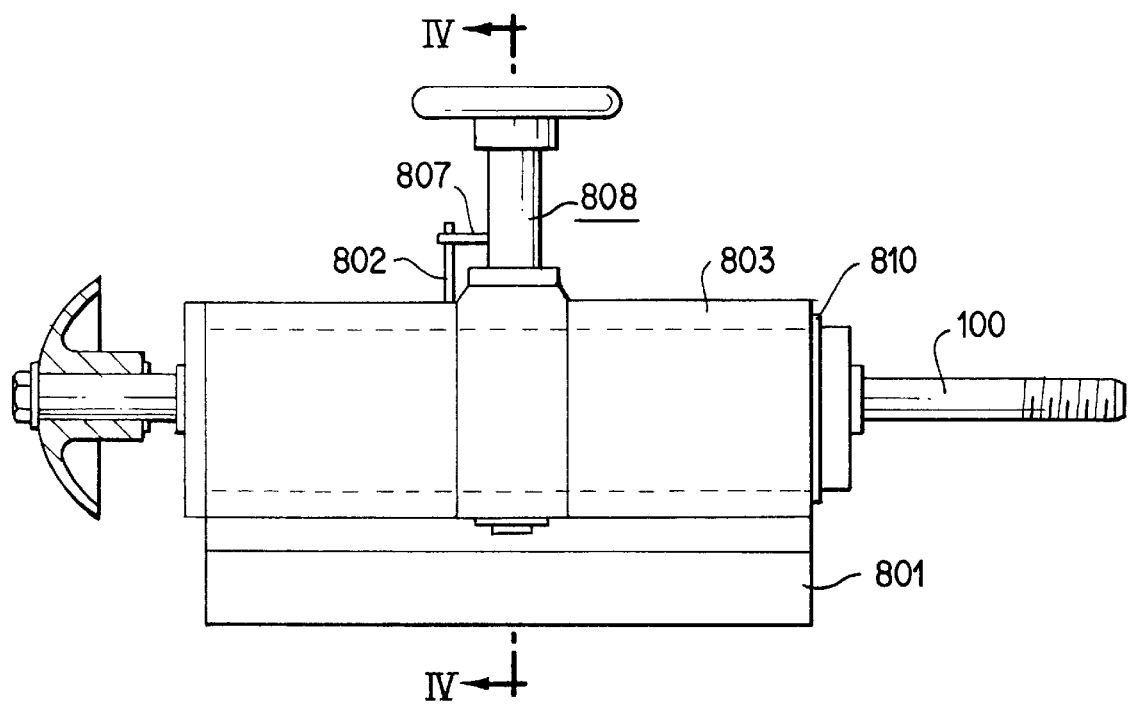
FIG. 17A shows a front view of the eighth embodiment of the fan clutch device.
Figure 17B:
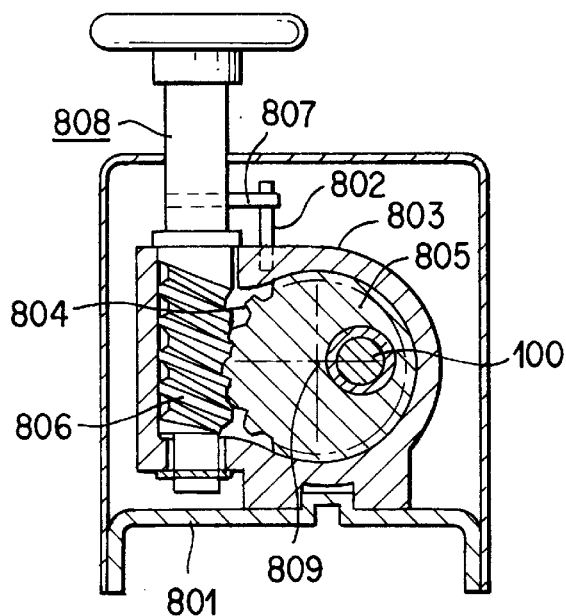
FIG. 17B shows a sectional view of the line IV—IV of FIG. 17A.

FIGS. 17A and 17B show the eighth embodiment of the fan clutch device C. This fan clutch device comprises a lower bracket 801 arranged on the base bracket 80, a housing 803 which is mounted on the upper surface of said lower bracket and has a stopper 802, a cylinder 805 which is turnable centering around the turning axis 809 inside said housing and is eccentrically supporting the fan impeller shaft 100 and also has a partial worm wheel tooth 804 around its outer circumference, an interrupting handle 808 which is mounted at the housing 803 vertically and the lower end of which has a worm 806 to be meshed with said worm wheel tooth 804 and also has a pin 807 at the one side of its top part to restrict the turning amount of the handle by being blocked with the said stopper 802. A cylinder snap ring 810 may be further provided for making anti-gap.

Therefore, if the interrupting handle is turned to the left, the pin 807 will be blocked by the stopper 802 and no more turning will be allowed. During this operation said slider cylinder 805 turns to clockwise direction by the movement of the worm centering around 806 said turning axis 809 and, thus, the driven bevel friction wheel 90 will be in contact with the driving bevel friction wheel 30 according as the fan impeller shaft 100 lowers down centering around the said turning shaft as the axis. Also, if the interrupting handle is turned to the opposite direction, the pin 807 will be blocked by the stopper 802 and no more turning counterclockwise direction will be allowed. Through this operation, said slider cylinder 805 turns to counter-clockwise direction by the movement of said worm 806 and the driven bevel friction wheel 90 will be detached from the driving bevel friction wheel 30 according as the fan impeller shaft which is supported eccentrically on said cylinder 100 moves upward centering around said turning axis 809.

Figure 18A:
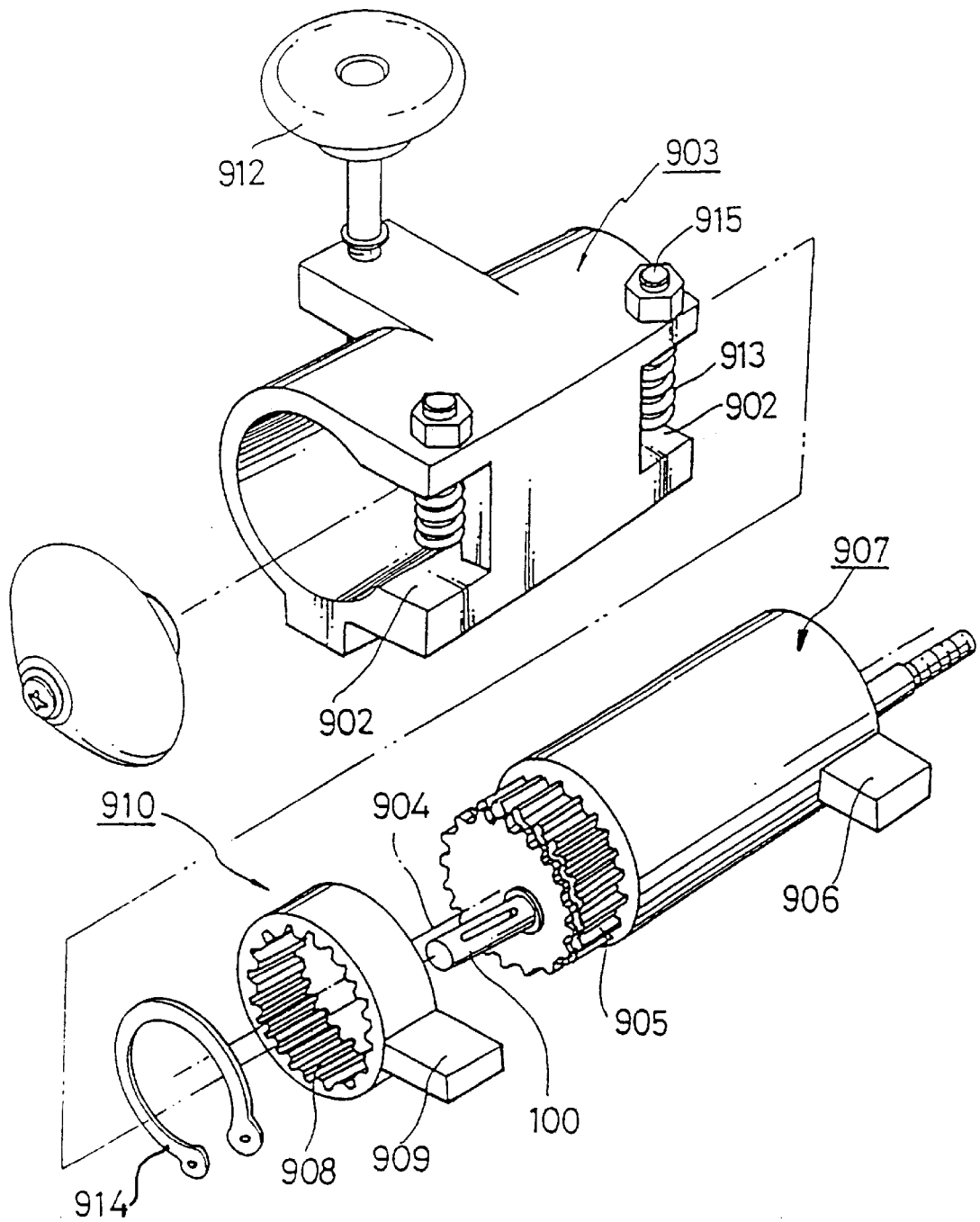
FIG. 18A shows an explosive view of the ninth embodiment of the fan clutch device.
Figure 18B:
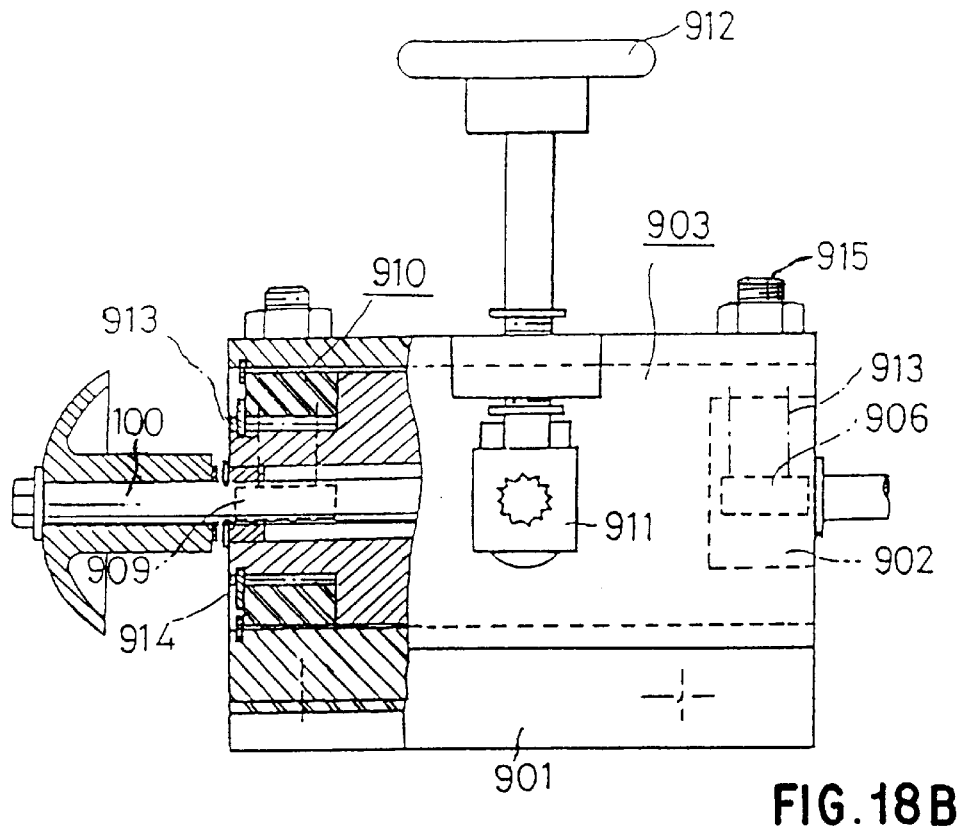
FIG. 18B shows a sectional view of the clutch depicted FIG. 18A.
Figure 18C:
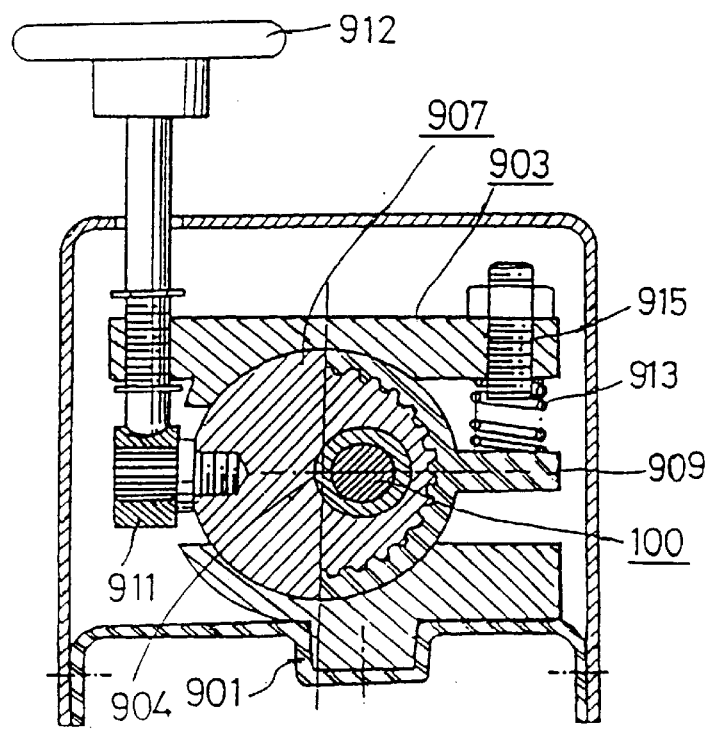
FIG. 18C shows a side sectional view of FIG. 18B.

The ninth embodiment of the fan clutch device C is shown in FIG. 18A to 18C. This fan clutch device comprises a lower bracket 901 arranged on the base bracket 80, a housing 903 mounted on the upper surface of said lower bracket and both side of which have recesses 902, a cylindrical rod 907 which is turnable around the turning axis 904 inside said housing 903 and forms an outer spline 905 at one end thereof and a supporting member 906 at the other end which is inserted into said recess 902 and eccentrically supporting the fan impeller shaft 100, a supporting ring 910 having a supporting member 909 that is inserted into the said recess 902 at the one end of the outer circumference thereof and an inner spline 908 at its inner circumference meshed with said outer spline 905 of said cvlindric rod, an interrupting handle 912 which is screwed to the said housing 903 whose lower end is contacting the connecting part 911 integrated to said cvlindric rod 907 and compression springs 913 that are elastically inserted between said supporting member 906 & 907 and the upper end of said housing 903. It is desirable for said interrupting handle 912 to be screwed to the housing 903 by forming a rectangular screw with a big pitch at its lower end, and, thus, being elevatable. The symbol 914 represents a snap ring for preventing dislocation of said supporting ring 910 and the symbol 915 represents a set screw for elastically arranging said springs 913.

Therefore, if the interrupting handle 912 is turned and, thus, moves upward, the supporting members 906 & 909 lower down by the elasticity of the springs 913 and, then, the driven bevel friction wheel 90 will contact with the driving bevel friction wheel 30 due to lowering down of the fan impeller shaft 100 according as the cvlindric rod 907 turns clockwise centering around the turning axis 904. Also, if the interrupting handle 912 is turned to the opposite direction, the driven bevel friction wheel 90 will be detached from the driving bevel friction wheel 30 due to the upward movement of the fan impeller shaft 100 according as the cylindric rod 909 turns counterclockwise centering around the turning axis 904.

Figure 19:
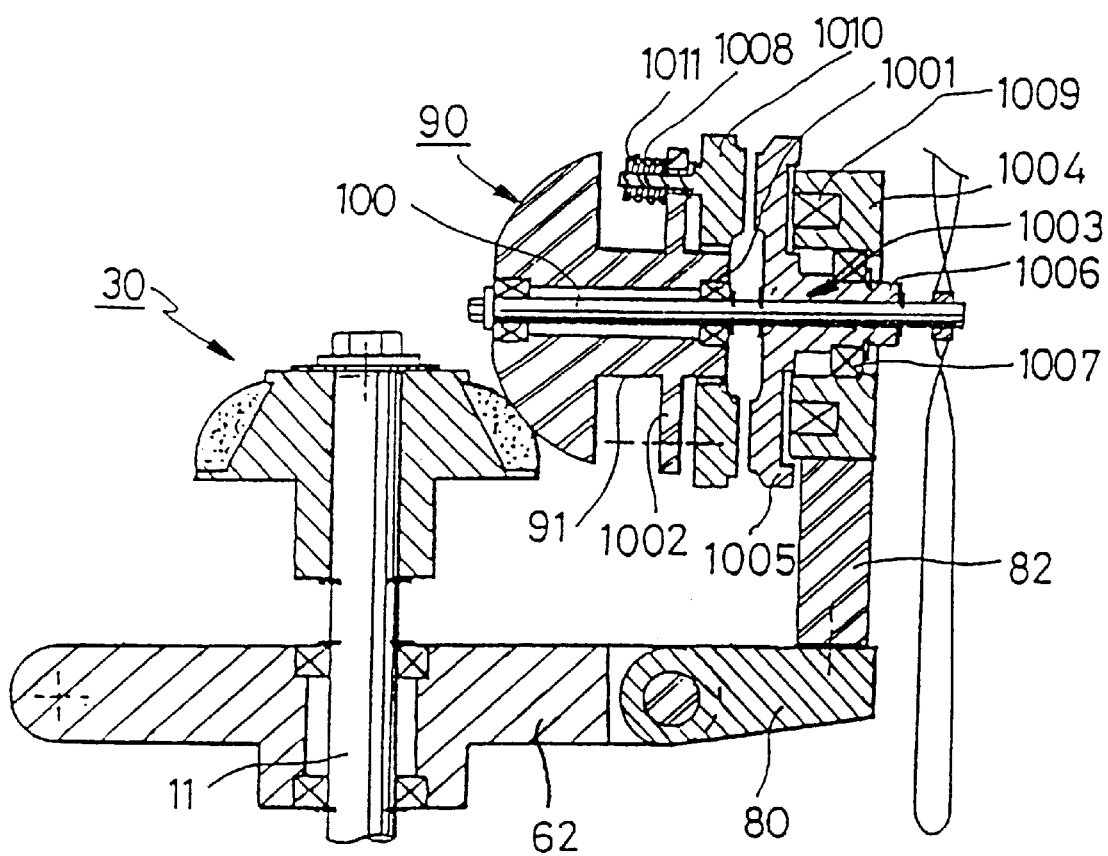
FIG. 19 shows a sectional view of the tenth embodiment of the fan clutch device.

FIG. 19 shows the tenth embodiment of the fan clutch device C. The fan clutch device according to this embodiment comprises a driven bevel friction wheel 90 turnably secured at one end of the fan impeller shaft 100 with interposition of the bearing 1001, an annular flange 1002 formed at the boss part of said driven bevel friction wheel 90, an electromagnetic clutch device mounted on the fan impeller shaft coaxially for operationally interrupting the connection of said driven bevel friction wheel 90 with the driving bevel friction wheel 30, said electro-magnetic clutch device including a yoke 1004 mounted on the lower bracket 82, a rotor 1005 that is mounted on the fan impeller shaft 10 coaxially and supported by said yoke, an amateur plate 1010 which operationally contacts/discontacts to/from the facing of rotor by the magnetizing/demagnetizing of said electro-magnetic clutch and compression springs which are elastically arranged around the front end of the pins 1008 which are formed on said amateur plate and movably inserted into said annular flange of the driven wheel. The electric wire to said clutch coil 1009 is interconnected to the control switch device 180.

Therefore, if the coil 1009 is magnetized, the amateur plate 1010 will adhere to the rotor 1005 and, thus, the fan impeller shaft 100 turns along as the driven bevel friction wheel 90 turns. Also, if the coil 1009 is demagnetized, the amateur plate 1010 will move away from the rotor 1005 due to the elasticity of the spring 1011 and thus the fan impeller shaft does not turn.

Figure 20A:
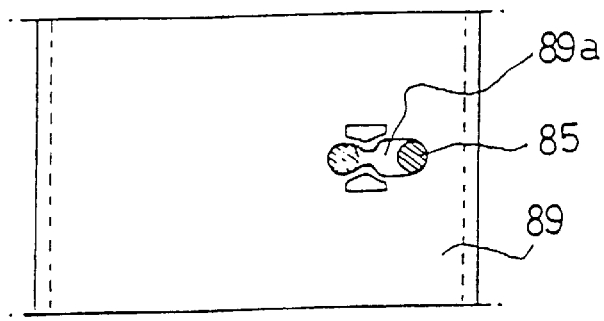
FIG. 20A shows a top view of the cover in the eleventh embodiment of the fan clutch device which illustrates a shifting guide for the handle.
Figure 20B:
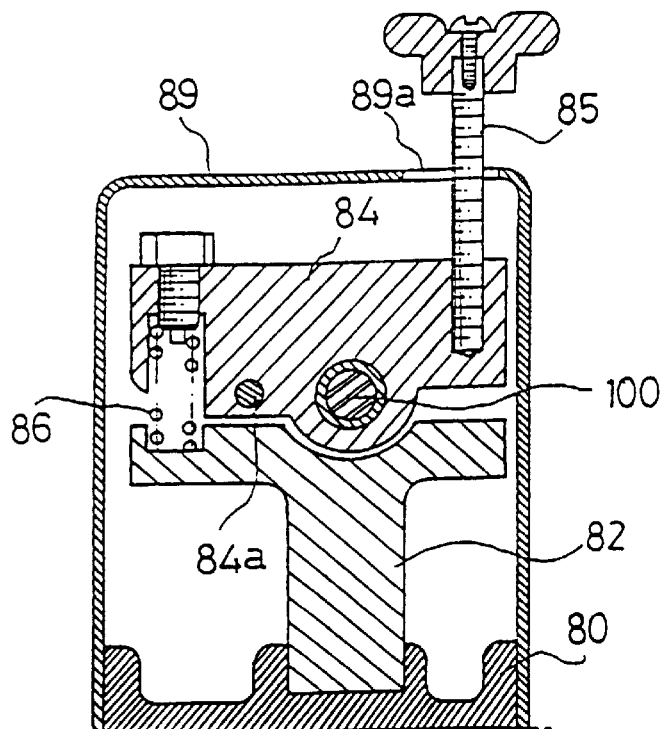
FIG. 20B shows a sectional view of the eleventh embodiment of the fan clutch device.
Figure 20C:
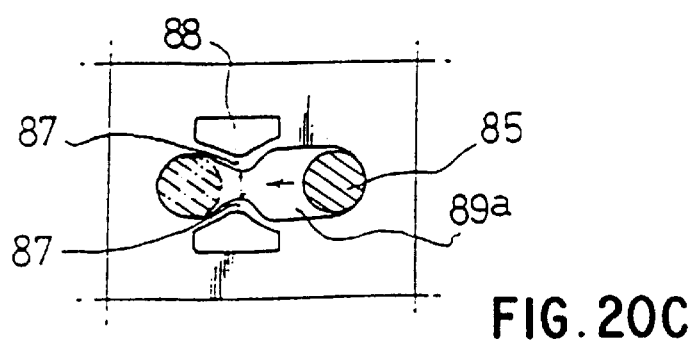
FIG. 20C shows an enlarged view of FIG. 20A.

FIGS. 20A to 20C show still another embodiment of the fan clutch device C designed according to the present invention which comprises a lower bracket 82 secured to the base bracket 80, an upper bracket 84 which is turnably supporting the fan impeller and is pivotably coupled with said lower bracket by means of a pivoting pin 84a, a compression spring 86 which exerts such the pivoting force as to make the upper bracket be pivoted centering around said pivot pin 84a, a cover 89 which covers said lower bracket and upper bracket and a manipulating handle 85 whose one end is fixedly secured on the upper bracket and the other end extends to outside of said cover through a guide way 88 formed on said cover, said guide way including an oblong hole 89a which has an operationally expendable neck 87 in the middle of the length thereof to firmly cramp the handle when it is shifted.

Therefore, in this embodiment when the handle is pushed to the left, the upper bracket 84 along with the fan impeller shaft 100 turns up centering around the pivot pin 846 and maintains the detached condition of the driven wheel from the driving wheel due to the cramping force of said neck of the guide way. On the other hand when the hand is shifted to the right said cramping force is released and, thus, the upper bracket turn down by the elasticity of the spring 86. Symbol 88 represents a hole which makes said neck elastically extended when the handle is shifted from right to left and vice-versa.

Following are descriptions of the clutch device 40 placed inside of the lower space S2 of the housing for interruptably delivering the turning force of the lower driving shaft 12 to a crank device 120 which makes the rotary disk 60 swing in horizontal direction.

Said clutch device 40, as shown in FIGS. 1 and 2, comprises a worm 41 formed at the outer circumference of the lower driving shaft 12, a worm wheel 43 which has a hollow part 42 and is meshed with said worm, an operating handle 47 which has an elongated rod member slidably secured inside the hollow part 42 of said worm wheel 43, and is equipped with a ball key 46 to interrupt the turning force of the worm wheel 43 and whose one end has a spur gear 44 around its outer circumference and the other-end has a manipulating knob 45 and a reduction gear 48 that is connected with said spur gear 44.

The crank device 120 which makes the rotary disk 60 swing to left and right by transforming the turning force of the reduction gear 48 received via a pair of bevel gears 121

& 122 and a crank shaft 123 arranged outside of the housing to a swing movement.

At one outer side of said housing 20 a cover 190 which has the same height as the housing is attached. This cover serves to enclose the crank shaft 123 and also defines a space for setting a control switch device 180. The symbols 191 and 192 represent an upper plate and a lower plate for turnably supporting the crank shaft 123, respectively.

Around the outer circumference of the upper end of said crank shaft 123, is turnably secured a guide drum 193. Said drum serves to give a guide way for a tension spring which is provided so as to get rid of blowing reaction and, thus, to stabilize the swing movement of the fan impeller. The crank arm 124 is connected at the upper end of said crank shaft 123 and, a connecting rod 125 is turnably fixed between the end of said crank arm 124 and the bottom surface of the rotary disk 60.

The connecting rod 125 has pin inserting holes 126 with an equal distance along the length to optionally adjust the crank angle.

At the lower end of said crank shaft 123 the bevel gear 121 which is connected to the bevel gear 122 mounted at one end of the reduction gear shaft is secured and, thus, the driving force of the reduction gear 48 is transmitted to the said crank shaft 123.

The driving force of the lower driving shaft 12 is operationally interrupted by pushing and pulling the clutch operating knob 45 of the clutch device 40. That is, in case when the fan impeller shaft 100 is not to be swung in horizontal direction then the fan impeller should stay where it is by not transmitting the turning force of the lower driving shaft 12 to the crank shaft 123 through decoupling the ball key 40 from the worm wheel 43 by pulling the knob 45 toward outside of the housing. On the contrary, in case when the fan impeller shaft 100 is to be swung, the rotary disk 60 should swing by transmitting the turning force of said worm wheel 43 to the crank shaft 123 via the spur gear 44, the reduction gear 48 and then the bevel gears 121, 122 in turn by pushing the clutch operating knob 45 toward inside of the housing.

Figure 4:
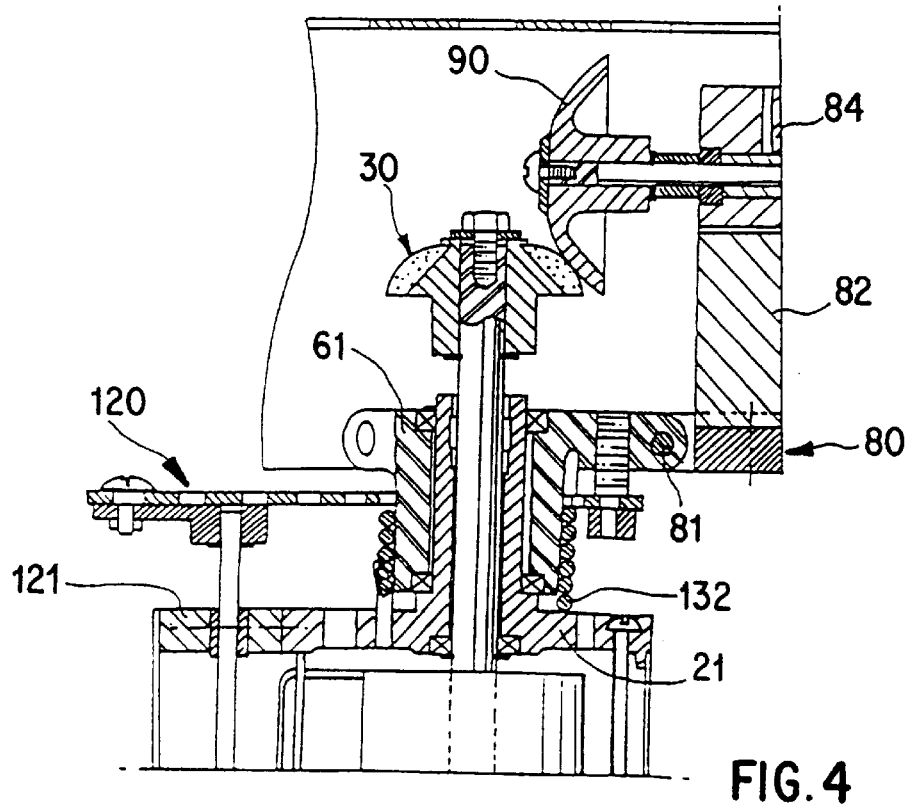
FIG. 4 shows a sectional view of the torsion spring mounted around the rotary disk as a stabilizer designed according to the present invention by which the leftward and rightward swing movement of the rotary disk can be stabilized.

Following are the descriptions of the structure of the stabilizer 130 which stabilizes the swing movement of the rotary disk 60 according to the present invention. FIGS. 1, 2, and 4 can be referred to for the description of the stabilizer. As mentioned before, previously invented electric fan is one with three fan impellers and, so, when the fan impellers are swinging simultaneously, the blowing amount will increase and so will the blowing reaction.

Therefore, the electric fan implemented according to the present invention is characteristically equipped with a stabilizer to even the blowing reaction of the fan impeller. This stabilizer comprises a tension spring which can control the unstable swing movement of the fan impeller and is constructed as shown in FIG. 1 and FIG. 2 whose one end is secured on the upper plate 21 of the housing and the other end is secured on the bottom surface of the flange of the rotary disk 60 while its length passes by the outer circumference of said guide drum 193 in a state of tension, or, as shown in FIG. 4, by providing a torsion spring 132 around the cylindric part 61 of said rotary disk whose one end is fixedly secured on the bottom surface of the flange of said rotary disk and the outer end is fixedly secured on the upper surface of the upper plate 21 of the housing.

Said tension spring 131 or torsion spring 132 surely serve to prevent the over speed turning of the rotary disk caused by the plus effect of the blowing reaction which is added to the turning force by forcing the elasticity of the spring to the opposite direction of the turning direction of the rotary disk 60. To be more specific, the evening of the turning movement of the fan impeller can be achieved by applying the same amount of elasticity of the spring 131 or 132 to the disk 60 as that of caused by blowing reaction.

Now, the coupling relation between the upper body and lower body is described as follows.

Since the electric fan designed according to the present invention is so structured as to removably integrate the upper end of the supporting rod 54 of the lower body 2 with the center of the lower plate 23 of the upper body 1 coaxially by a fixing bolt 170, if the lower body is removed by releasing said fixing bolt 170 the upper body can be used as a short up-right standing type or an attach-to-ceiling type or an attach-to-wall type as shown in FIGS. 1, 24, 25, 26 and 27.

Particularly, concerning this, the control switch device 180 is placed at the upper body 1 and the electric wire to be connected to the control switch is connected to the wire 183 extended from inside of the supporting rod 54 of the lower body by means of a plug 181 and an outlet 182 as shown in FIG. 1.

Figure 24:
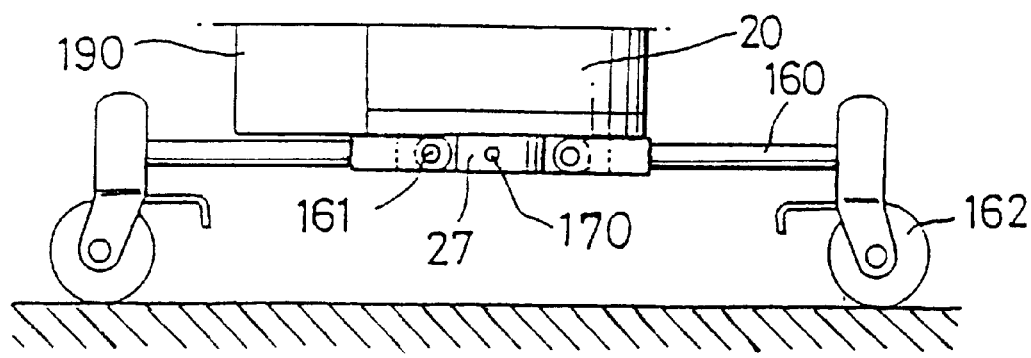
FIG. 24 shows a partial front view of the carrying handles with wheels at their free-ends.
Figure 25:
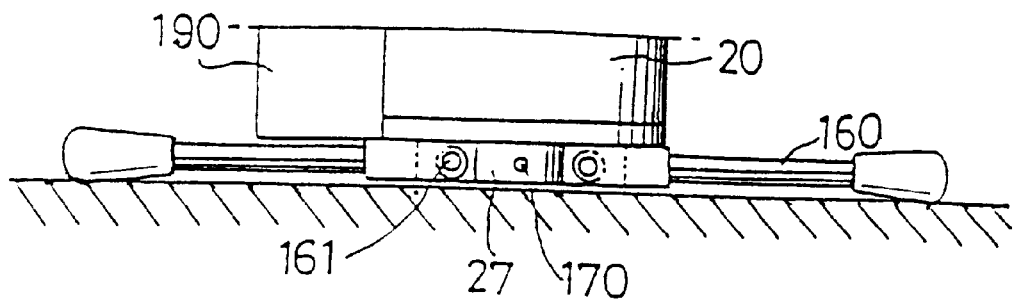
FIG. 25 shows a partial front view of the handle spread on the around by detaching the lower body designed according to the present invention.

Further, the electric fan designed according to present invention has at least two but preferably four foldable carrying handles mounted at the bottom surface of the said housing as shown in FIGS. 1 and 23 to 25 and may include 360-degree rotatable moving wheels 162 to move around at the free ends of said handles as shown in FIG. 24. The FIG. 25 shows another usage of said handle 160 without the moving wheel.

Figure 21:
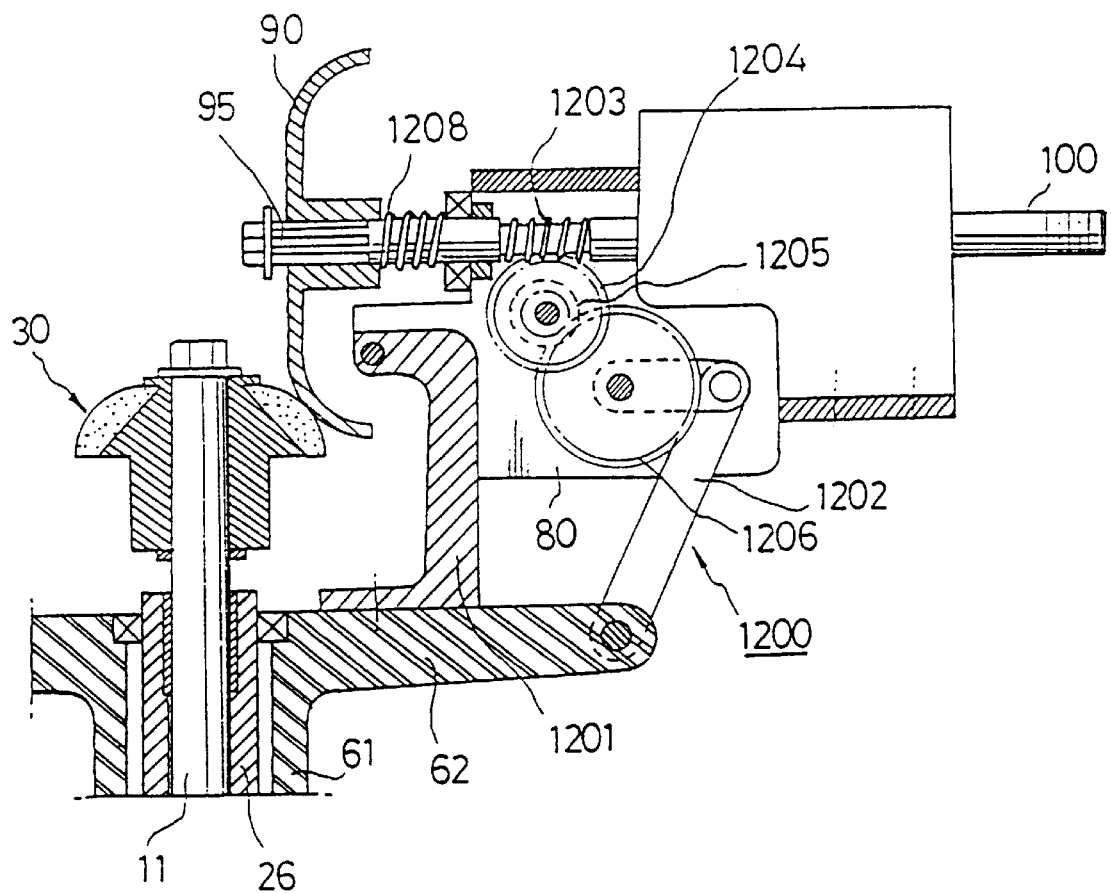
FIG. 21 shows a sectional view of the crank which makes the fan impeller shaft move up and down.
Figure 22:
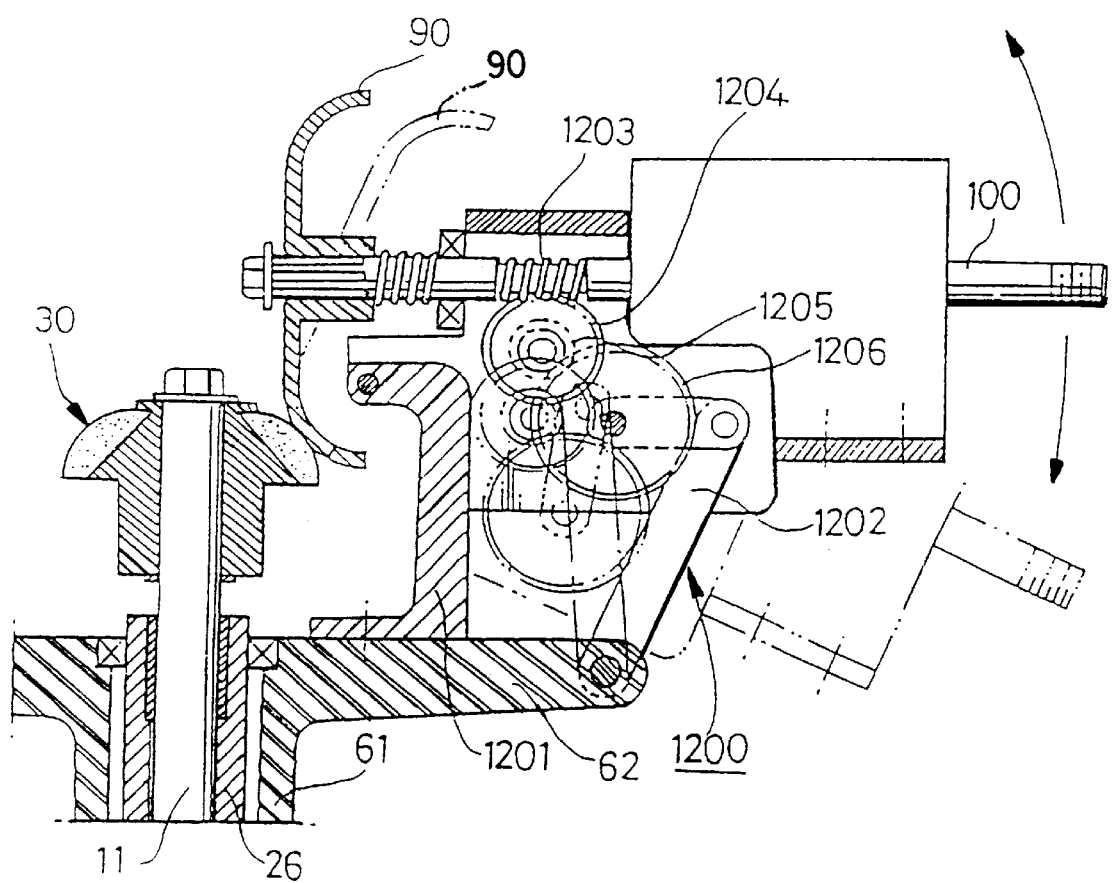
FIG. 22 shows a sectional view of the crank which is under the operational state of up and down movement of the fan impeller shaft shown in FIG. 20.
Figure 23:
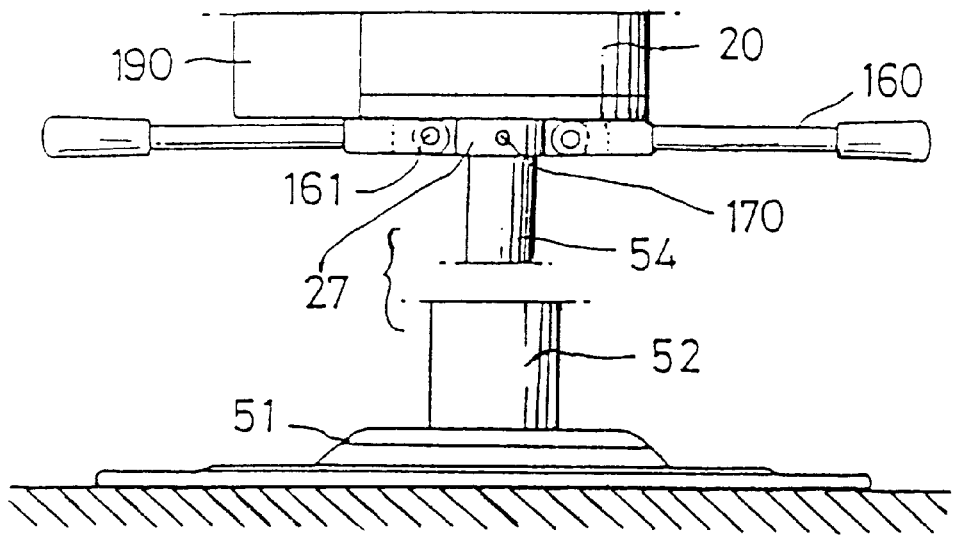
FIG. 23 shows a partial front view of the carrying handle stretched state designed according to the present invention.

Further, the upper body of the electric fan designed according to present invention may include a second crank device 1200 for swinging vertically the fan impeller shaft centering around the upper driving shaft 11. The second crank device, as shown in FIG. 21 and FIG. 22, may comprise a turnable worm 1203 formed at one end of the fan impeller shaft 100, a worm wheel coupled with said worm 1203, a plurality of reduction and/or crank gears 1205 & 1206 which operate the crank rod 1202. Said worm wheel and crank gears and crank rod are mounted on the base bracket 80. On the flange 62 is fixed an upright supporting bracket 1201 whose one end pivotably supports said base bracket 80 and the lower end of said crank rod 1202 is also pivotably secured on the flange 62.

From the above construction, if the driven bevel friction wheel 90 mounted at one end of the fan impeller shaft 100 turns by receiving driving force from the motor M, the crank gears 1205 & 1206 fixed to the worm wheel 1204, which is in turn meshed with the worm 1203 of the fan impeller shaft 100, move and, thus, the fan impeller shaft 100 swings around to the arrow direction shown in FIG. 22.

As mentioned before, the driving force transmission under the condition of vertical swing movement of the fan impeller shaft is possible by keeping the contacting state of the two wheels regardless of the contacting angle of the fan impeller shaft 100 to the driving motor shaft 11 due to implementation of the convex shape thereof, and by slidable coupling the driven bevel friction wheel 30 and the driving bevel friction wheel 90 with the shaft 11 & 100 respectively, and also by mutually pressing to each other by the compression spring 33 and/or 93 and the spline connection 35 and/or 95.

Therefore, the electric fan designed according to present invention can send the wind to all directions simultaneously or individually e.g. up, down, left, and right by the first crank device 120 and the second crank device 1200.

Figure 26:
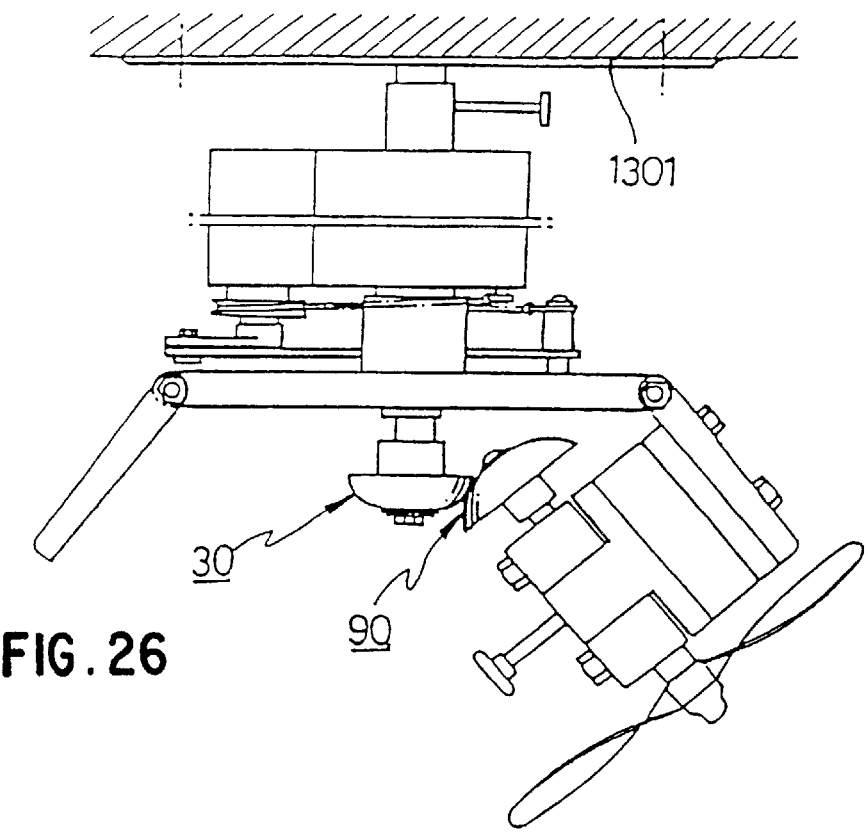
FIG. 26 shows a sectional view of the upper body of the electric fan as an attach-to-ceiling type.
Figure 27:
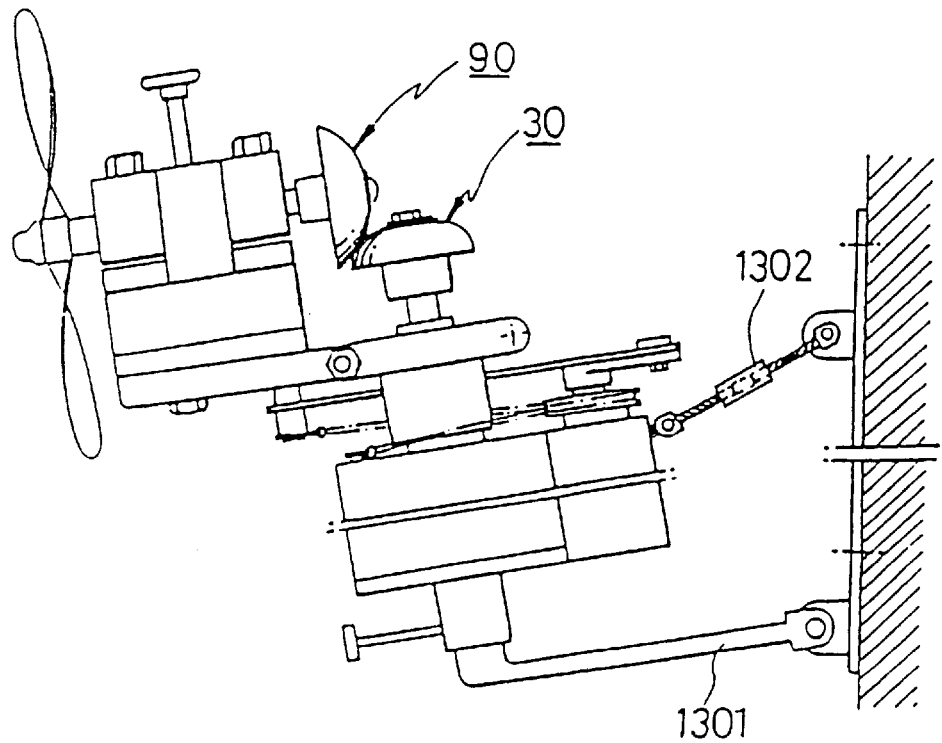
FIG. 27 shows a sectional view of the upper body of the electric fan as an attach-to-wall type.

FIG. 26 and FIG. 27 show an attach-to-ceiling type and an attach-to-wall type of the electric fan designed according to present invention. In the embodiments as shown in these figures, a bracket 1301 and/or a turn buckle 1302 that has an appropriate structure and form are used so as to hang the electric fan to the wall and/or the ceiling instead of to the lower body 2.

As can be well understood from the above descriptions, the driving force transmission from the driving bevel friction wheel 30 mounted at the upper end of the driving motor shaft 11 to the driven bevel friction wheel 90 mounted at one end of the impeller shaft 100 is achieved with a certainty by applying smoothly convex contacting surfaces and also due to this the contacting angle can be adjusted. The electric fan according to the present invention also has an advantage that the swing movement of the fan impeller is stabilized by the stabilizer 130.

Further, in the electric fan designed according to the present invention, the manipulation of the fan clutch device C is comparable simple and has the advantage of being able to separate the upper body from the lower body and, thus, this results in the usage of the same electric fan as the short up-right standing type, the attach-to-wall type, or the attach-to-ceiling type, and the foldable carrying handles 160 can serve to move it very conveniently.

The electric fan designed according to the present invention is not limited to the above mentioned structures or elements. A fan that has the technological components which can be replaced with those of the present invention should be understood as being in the scope of the present invention. For example, the housing space and the control switch mounting space are separately formed in above structures, however these can be combined to form a single space by combining the upper plate 21 of the housing with the crank shaft supporting upper plate 191, the middle supporting plate 22 with the crank shaft supporting central plate 192 and the cover 190 with the side plate 29 of the housing, respectively.

Also, by covering or hiding partially or totally the driven bevel friction wheel and the driving bevel friction wheel, each fan impeller and/or the fan clutch device with appropriate covers 1400, 1401, casualties and dust can be avoided. However, it should be also understood that this cover is nothing but a design element of the conventional electric fan, therefore, the structure, availability of such a cover is not in the technological content of the present invention.

What is claimed is:

1. An electric fan comprising an upper body and a lower body which is removably attached to said upper body as a support, said upper body comprising:
    a cylindrical housing including a housing axis, an upper plate, a middle supporting plate, and a lower plate, said plates extending perpendicular to said housing axis and being spaced from each other along said housing axis, and a wall plate which circumscribes an outer circumference of each of said upper, middle and lower plates;
    a driving motor including an upper driving shaft and a lower driving shaft, said driving motor being coaxially mounted to the axis of said housing and secured between said upper plate and said middle supporting plate, wherein a free end of the upper driving shaft passes through said upper plate and extends out of said housing, and said lower driving shaft extends downward and passes through said middle supporting plate;
    a rotary disk including a trident flange and a cylindrical part turnably mounted around said upper driving shaft;
    a plurality of fan impeller shafts arranged at an angle to the upper driving shaft of the motor for receiving a driving force from the upper driving shaft;
    base brackets pivotally secured to the flange of said rotary disk for supporting a respective one of the fan impeller shafts;
    fan clutch devices arranged at said base brackets so that each of the fan impeller shafts can independently receive the driving force of said upper driving shaft;
    a motor clutch device located between said middle supporting plate and said lower plate of the housing for selectively transmitting a driving force of said lower driving shaft to a first crank device;
    said first crank device being capable of making said rotary disk swing orthogonally around said upper driving shaft;
    a stabilizer for countering a blowing reaction force of a plurality of fan impellers and for stabilizing a swing movement of the fan impellers; and
    a control switch including an interrupting electric connector mounted on one side of said housing; and
    said lower body comprising:
        a substantially flat base plate for supporting the weight of said upper body; and
        a supporting rod comprising a lower hollow cylindrical member fixedly secured to a central portion of said base plate, an extendible upper cylindrical member inserted into said lower cylindrical member, a compression spring arranged beneath said extendible upper cylindrical member, and an upper end of said upper cylindrical member being removably secured to a central portion of the lower plate of the housing.

2. The electric fan as claimed in claim 1, wherein said housing is divided into an upper space and a lower space by said middle supporting plate, said driving motor being located in said upper space, and a clutch device mounted in said lower space for interrupting the driving force of said lower driving shaft.

3. The electric fan as claimed in claim 2 further comprising a motor cooling fan circumferentially fixed to the lower driving shaft of the motor inside said upper space of said housing, and a plurality of ventilating holes on said upper plate, said middle supporting plate and said lower plate of said housing so as to prevent overheating of the motor.

4. The electric fan as claimed in claim 1, further comprising a driving bevel friction wheel and a plurality of driven bevel friction wheels, and wherein said upper driving shaft and said lower driving shaft are a single body driven simultaneously by the driving motor, said upper driving shaft serves to drive said fan impeller shafts through said driving bevel friction wheel and said driven bevel friction wheels and said lower driving shaft makes the rotary disk turn through the motor clutch device.

5. The electric fan as claimed in claim 4, further comprising a plurality of slope adjusting bolts, and wherein said trident flange includes a plurality of flange members each pivotally secured to a respective one of said base brackets by a respective one of said slope adjusting bolts, and each of said fan impeller shafts are substantially horizontally arranged on a respective one of said base brackets so that a respective one of the bevel friction wheels mounted at one end thereof can receive the driving force of the driving bevel friction wheel mounted on the upper free end of the driving shaft.

6. The electric fan as claimed in claim 5, wherein said driving bevel friction wheel and said driven bevel friction wheels each include at least one slanted surface, and wherein at least one of said slanted surfaces of said driving bevel friction wheel and a cooperating one of said driven bevel friction wheels includes a smoothly convex shape capable of transmitting a driving force regardless of a change in contact angle between the cooperating driving and driven bevel friction wheels.

7. The electric fan as claimed in claim 6, wherein said driving bevel friction wheel and said driven bevel friction wheels includes a cone-structured boss member, and wherein said at least one of said slanted surfaces is covered with a substantially smooth elastic synthetic plate which has solidity, elasticity and anti-abrasion characteristics.

8. The electric fan as claimed in claim 1, wherein the free end of the upper driving shaft and a free end of one of said fan impeller shafts each include a semi-circular shaped bevel gear for transmitting the driving force of said upper driving shaft therebetween.

9. The electric fan as claimed in claim 6, wherein a compression spring is positioned between a bearing and a bottom surface of a boss member of one of said cooperating driven bevel friction wheels and said driving bevel friction wheel, the other one of said cooperating driven and driving bevel friction wheels being coupled to one of the fan impeller shafts or the upper driving shaft by a spline connection so that each of said cooperating driven and driving bevel friction wheels is capable of applying compression force to the other.

10. The electric fan as claimed in claim 1 further comprising, a plurality of carrying handles which are foldably secured on a bottom of said lower plate of the housing and centered around the housing axis.

11. The electric fan as claimed in claim 10, wherein free ends of said carrying handles are attached to 360-degree turnable rolling wheels.

12. The electric fan as claimed in claim 1, wherein at least one of said fan clutch devices comprises a lower bracket fixed to a respective one of the base brackets, said lower bracket including a connecting protrusion and a hollow cylindrical column having a ramp with an upper end having a groove and a lower end having a groove, an upper bracket pivotally coupled to said lower bracket by a pivot pin, said upper bracket rotatably receiving a respective one of the fan impeller shafts, a cylindrical rod with a pin for turnably inserting into said hollow column, said cylindrical rod having a pin capable of being guided along the slope of said ramp for creating a cam-like action, and a manipulating knob connected to said cylindrical rod.

13. The electric fan as claimed in claim 1, wherein each said fan clutch device comprises a lower bracket fixed to a respective one of the base bracket by a fastening member, said lower bracket including a connecting protrusion and a hollow cylindrical column having a ramp with grooves formed on an upper end and a lower end thereof, an upper bracket pivotally coupled to said lower bracket by mating said connecting protrusion with a recess formed on one side of said upper bracket with a pivot pin, a solenoid secured to said lower bracket, an operating rod having a tapered interrupting part at one end thereof and being slidable by said solenoid, a coupling plate of said solenoid fixed around a middle of said operating rod, a returning spring mounted around an outer circumference of said operating rod, supporting brackets mounted to said lower bracket for compressing said returning spring and serving as a sliding guide for said operating rod, an interrupting rod having an upper member fixed to the upper bracket and a lower member slideably extending through a portion of said hollow cylindrical member for contacting a slanted surface of said tapered interrupting part, and compression springs.

14. The electric fan as claimed in claim 1, wherein each said fan clutch device comprises a lower bracket fixed to a respective one of the base brackets, said lower bracket includes a connecting protrusion, an upper bracket pivotally coupled to said lower bracket by mating said connecting protrusion with a recess formed on one side of said upper bracket with a pivot pin, a solenoid attached to the lower bracket, an operating rod having an upper end secured to said upper bracket by a pin, a coupling plate of said solenoid fixed around a middle of said operating rod, and compression springs.

15. The electric fan as claimed in claim 1, wherein each said fan clutch device comprises a lower bracket integrated vertically to a respective one of said base brackets, an upper bracket including one end pivotally secured at an upper part of said lower bracket and a second end turnably supporting a respective one of the fan impeller shafts, a lever, a compression spring elastically arranged between said lever and said lower bracket and an interrupting handle including a pressing member which pivots said upper bracket about a pivot pin when said pressing member applies a force to said lever.

16. The electric fan as claimed in claim 1, wherein each said fan clutch device comprises a lower bracket arranged on a respective one of said base brackets, a cylinder mounted on an upper surface of said lower bracket, said cylinder having an end plate at a first end thereof and at a second end thereof and key grooves at both a top and a bottom of an inner circumference of said cylinder, a slider including oilless bushes which turnably support a respective one of said fan impeller shafts and include keys at both a top and a bottom of an outer circumference thereof for inserting into said key grooves, respectively, each said fan clutch device further comprises an operating member screwed to one of said end plates with a large pitch, an interrupting handle fixed at one side of an outer circumference of said operating member, and a compression spring elastically inserted between one of said end plates and the slider.

17. The electric fan as claimed in claim 1, wherein each said fan clutch device comprises a lower bracket arranged on a respective one of the base brackets, a cylinder including first and second ends each having an end plate, said cylinder being secured at a top surface of said lower bracket, a slider including oilless bushes for turnably supporting one of the fan impeller shafts, an interrupting handle having a bottom end that passes through an upper surface of said cylinder and is secured at an outer circumference of said slider, a compression spring elastically inserted between one of said end plates and the slider, and a guiding opening including an oblong hole, a short hole and a connecting hole on the top surface of the cylinder, the interrupting handle being capable of shifting through said guiding opening.

18. The electric fan obtained in claim 1, wherein each said fan clutch device comprises a lower bracket arranged on a respective one of the base brackets, a cylinder having first and second ends including snap rings, said cylinder being secured on said lower bracket, a slider for turnably supporting one of the fan impeller shafts, said slider being slidably mounted inside said cylinder with oilless bushes, an interrupting handle passing through an upper surface of said cylinder and having a bottom end secured at an outer circumference of said slider, a compression spring elastically inserted between a first side of said slider and one of said snap rings, oil storing fillers inserted around the oilless bushes, an oil leakage absorbing filler, an oil leakage preventing cover and an oil leakage rubber plate positioned proximate said slider for preventing oil leakage.

19. The electric fan as claimed in claim 1, wherein each said fan clutch device comprises a lower bracket arranged on a respective one of the base brackets, an upper bracket mounted on said lower bracket and formed by a top part of a vertical guide member connected with at least one horizontal crossing member, a slider for supporting a respective one of the fan impellers shafts and arranged so as to be capable of sliding along said guide member inside the upper bracket, a compression spring positioned between said at least one crossing member and an upper surface of said slider, a supporting member fixed at a middle of a connecting plate that connects side parts of said guide member, an interrupting handle having a lower part secured to said supporting member, and a lever supporting a lower part of said slider and being capable of pivoting about a supporting shaft.

20. The electric fan as claimed in claim 1, wherein each said fan clutch device comprises a lower bracket arranged on one of the base brackets, a fan clutch housing mounted on an upper surface of said lower bracket, a stopper, a cylinder which is rotatable about a turning axis within said fan clutch, said cylinder housing eccentrically supports a respective one of said fan impeller shafts and includes a partial worm wheel tooth around its outer circumference, and an interrupting handle vertically mounted at the fan clutch housing, a lower end of said interrupting handle including a worm for meshing with said worm wheel tooth, an upper part of said interrupting handle including a pin at one side thereof for cooperating with said stopper for restricting the turning of the handle.

21. The electric fan as claimed in claim 1, wherein each said fan clutch device comprises a lower bracket arranged on a respective one of the base brackets, a fan clutch housing mounted on an upper surface of said lower bracket, said fan clutch housing including first and second sides each having a recess, a cylindrical rod extending within said fan clutch housing and being rotatable about a turning axis, said cylindrical rod having an outer spline at one end thereof and a supporting member at the other end thereof for inserting into one of said recesses and eccentrically supporting one of the fan impeller shafts, a supporting ring having a supporting member extending from its outer circumference for inserting into the other of said recesses and an inner spline at its inner circumference for meshing with said outer spline of said cylindrical rod, an interrupting handle secured to said housing, said interrupting handle being in contact with a connecting part operatively connected to said cylindrical rod, and compression springs each positioned between a respective one of said supporting members and an upper end of said fan clutch housing.

22. The electric fan as claimed in claim 1, wherein each said fan clutch devices comprises a driven bevel friction wheel having a boss portion including an annular flange and an inner bearing for rotatably securing said driven bevel friction wheel to an end of one of the fan impeller shafts, an electro-magnetic clutch device coaxially mounted on said one of the fan impeller shafts for operationally interrupting a connection between said one of said fan impeller shafts and a driving bevel friction wheel, said electro-magnetic clutch device including a yoke mounted on a lower bracket, a rotor coaxially mounted on said one of the fan impeller shafts and supported by said yoke, an amateur plate for operationally connecting with and disconnecting from the face of said rotor when said electro-magnetic clutch device is magnetized and demagnetized, respectively, said amateur plate including an end having a plurality of pins moveably inserted into said annular flange of said driven wheel, and a plurality of compression springs each positioned around a respective one of said pins.

23. The electric fan as claimed in claim 1, wherein each said fan clutch device comprises a lower bracket secured to a respective one of the base brackets, an upper bracket for rotatably supporting one of the fan impeller shafts, said upper bracket being pivotally coupled with said lower bracket by a pivoting pin, a compression spring for exerting a pivoting force on said upper bracket, a cover for covering said lower bracket and said upper bracket, and a manipulating handle having a first end fixedly secured to the upper bracket and a second end extending outside said cover through a guide way formed in said cover, said guide way including an oblong hole having an operationally expendable neck at a point along its length for firmly holding the handle when it is shifted.

24. The electric fan as claimed in claim 1, wherein said stabilizer comprises a spring for controlling unstable swinging movement of the fan impellers having a first end secured on the upper plate of the housing and a second end fixed on a bottom surface of the trident flange of said rotary disk.

25. The electric fan as claimed in claim 1, wherein said motor clutch device comprises a worm formed at an outer circumference of the lower driving shaft of the motor, a worm wheel with a hollow part and being meshed with said worm, an operating handle with an elongated rod member slidably secured inside the hollow part of said worm wheel, said elongated rod member including first and second ends, a ball key for interrupting a turning power of said worm wheel, a spur gear positioned around a circumference of said first end of said elongated rod member and a manipulating member at said second end of said elongated rod member, said clutch further comprising a reduction gear for connecting with said spur gear.

26. The electric fan as claimed in claim 1 wherein said control switch is placed at the upper body and an electric wire connected to the control switch is interruptibly connected with a wire extending from an inside of the supporting rod of the lower body.

27. The electric fan as claimed in claim 1, said upper body further comprises a second crank device for swinging one of the fan impeller shafts in a vertical direction.

28. The electric fan as claimed in claim 27 wherein said second crank device comprises a turnable worm formed at one end of said one of said fan impeller shafts, a worm wheel coupled with said worm, and a plurality of gears for operating a crank rod.

29. An electric fan comprising:
  a cylindrical housing including a housing axis, an upper plate, a middle supporting plate, and a lower plate, said plates extending perpendicular to said housing axis and being spaced from each other along said housing axis, and a wall plate which circumscribes an outer circumference of each of said upper, middle and lower plates;
  a driving motor including an upper driving shaft and a lower driving shaft, said driving motor being coaxially mounted to the axis of said housing and secured between said upper plate and said middle supporting plate, wherein a free end of the upper driving shaft of the motor passes through said upper plate and extends out of said housing, and said lower driving shaft extends downward and passes through said middle supporting plate;
  a rotary disk including a trident flange and a cylindrical part turnably mounted around said upper driving shaft;
  a plurality of fan impeller shafts arranged at an angle to the upper driving shaft of the motor for receiving a driving force from the upper driving shaft;
  base brackets that are pivotally secured to the flange of said rotary disk for supporting a respective one of the fan impeller shafts;

fan clutch devices arranged at said base brackets so that each of the fan impeller shafts can independently receive the driving force of said upper driving shaft;

a motor clutch device located between said middle supporting plate and said lower plate of the housing for selectively transmitting a driving force of said lower driving shaft to a first crank device;

said first crank device being capable of making said rotary disk swing orthogonally around said upper driving shaft of the motor;

a stabilizer for countering a blowing reaction force of a plurality of fan impellers and for stabilizing a swing movement of the fan impellers;

a plurality of carrying handles centered around the housing axis and foldably secured on a bottom of said lower plate of the housing; and a control switch including an interrupting electric connector mounted on one side of said housing.

30. The electric fan as claimed in claim 29 further comprising moving wheels which are turnably fixed at ends of said carrying handles.

31. An electric fan comprising an upper body and a supporting bracket which is removably secured on said upper body, said upper body comprising:

a cylindrical housing including a housing axis, an upper plate, a middle supporting plate, and a lower plate, said plates extending perpendicular to said housing axis and being spaced from each other along said housing axis, and a wall plate which circumscribes an outer circumference of each of said upper, middle and lower plates;

a driving motor including an upper driving shaft and a lower driving shaft, said driving motor being coaxially mounted to the axis of said housing and secured between said upper plate and said middle supporting plate, wherein a free end of the upper driving shaft passes through said upper plate and extends out of said housing, and said lower driving shaft extends downward and passes through said middle supporting plate;

a rotary disk including a trident flange and a cylindrical part turnably mounted around said upper driving shaft;

a plurality of fan impeller shafts arranged at an angle to the upper driving shaft of the motor for receiving a driving force from the upper driving shaft;

base brackets pivotally secured to the flange of said rotary disk for supporting a respective one of the fan impeller shafts;

fan clutch devices arranged at said base brackets so that each of the fan impeller shafts can independently receive the driving force of said upper driving shaft;

a motor clutch device located between said middle supporting plate and said lower plate of the housing for selectively transmitting a driving force of said lower driving shaft to a first crank device;

said first crank device being capable of making said rotary disk swing orthogonally around said upper driving shaft;

a stabilizer for countering a blowing reaction force of a plurality of fan impellers and for stabilizing a swing movement of the fan impellers;

a control switch including an interrupting electric connector mounted on one side of said housing; and a supporting bracket comprising an attaching member operatively connected to said upper body for hanging said upper body to a wall or a ceiling.

32. The electric fan as claimed in claim 31 wherein said attaching member includes a turn buckle.

* * * * *